(12) United States Patent
Naito

(10) Patent No.: US 11,349,668 B2
(45) Date of Patent: May 31, 2022

(54) ENCRYPTION DEVICE AND DECRYPTION DEVICE

(71) Applicant: Mitsubishi Electric Corporation, Tokyo (JP)

(72) Inventor: Yusuke Naito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 16/475,298

(22) PCT Filed: Feb. 21, 2017

(86) PCT No.: PCT/JP2017/006300
§ 371 (c)(1),
(2) Date: Jul. 1, 2019

(87) PCT Pub. No.: WO2018/154623
PCT Pub. Date: Aug. 30, 2018

(65) Prior Publication Data
US 2019/0363891 A1    Nov. 28, 2019

(51) Int. Cl.
*H04L 9/32* (2006.01)
*G09C 1/00* (2006.01)
(Continued)

(52) U.S. Cl.
CPC .............. *H04L 9/3236* (2013.01); *G09C 1/00* (2013.01); *H04L 9/0643* (2013.01); *H04L 9/0869* (2013.01); *H04L 2209/04* (2013.01)

(58) Field of Classification Search
CPC ... H04L 9/3236; H04L 9/0643; H04L 9/0869; H04L 2209/04; G09C 1/00
See application file for complete search history.

(56) References Cited

U.S. PATENT DOCUMENTS 7,949,129 B2    5/2011 Rogaway
8,321,675 B2    11/2012 Rogaway
(Continued)

FOREIGN PATENT DOCUMENTS

JP    2009-278565 A    11/2009
JP    2010-522477 A    7/2010
(Continued)

OTHER PUBLICATIONS

Chakraborty et al., "A General Construction of Tweakable Block Ciphers and Different Modes of Operations" IEEE Trans. Information Theory, vol. 54, No. 5, 2008, pp. 1991-2006.
(Continued)

*Primary Examiner* — Hee K Song
(74) *Attorney, Agent, or Firm* — Birch, Stewart, Kolasch & Birch, LLP

(57) ABSTRACT

An encryption device (10) is an encryption device in authentication encryption. A key generation unit (21) generates a key K of an encryption function E of a block cipher, in accordance with an initial parameter N. A hash calculation unit (22) calculates a hash value msk with an internal parameter ctr as an input. An encryption unit (23) generates a ciphertext c of the message m by using the encryption function E, with a key K generated by the key generation unit (21), a hash value msk calculated by the hash calculation unit (22), and a message m as inputs.

10 Claims, 30 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 2002/0071552 A1 | 6/2002 | Rogaway | |
| 2008/0232591 A1 | 9/2008 | Jutla | |
| 2010/0246809 A1 | 9/2010 | Noda et al. | |
| 2010/0329449 A1 | 12/2010 | Minematsu | |
| 2012/0057702 A1 | 3/2012 | Minematsu | |
| 2013/0077780 A1 | 3/2013 | Rogaway | |
| 2013/0308775 A1* | 11/2013 | Minematsu | H04L 9/0625 380/28 |
| 2014/0223197 A1* | 8/2014 | Gueron | G06F 21/72 713/193 |
| 2015/0180666 A1 | 6/2015 | Minematsu | |
| 2015/0261965 A1 | 9/2015 | Brumley et al. | |
| 2015/0349950 A1* | 12/2015 | Shrimpton | G06F 12/1408 713/189 |
| 2016/0173276 A1* | 6/2016 | Minematsu | G09C 1/00 380/28 |
| 2017/0272239 A1 | 9/2017 | Minematsu | |
| 2017/0334858 A1 | 11/2017 | Reddy et al. | |
| 2018/0148412 A1 | 5/2018 | Reddy et al. | |

FOREIGN PATENT DOCUMENTS

| | | |
|---|---|---|
| JP | 2011-40932 A | 2/2011 |
| JP | 2014-2230 A | 1/2014 |
| JP | 2016-75765 A | 5/2016 |
| JP | 2016-157055 A | 9/2016 |
| WO | WO 2007/105709 A1 | 9/2007 |
| WO | WO 2009/078217 A1 | 6/2009 |
| WO | WO 2009/128370 A1 | 10/2009 |
| WO | WO 2010/131563 A1 | 11/2010 |
| WO | WO 2014/013680 A1 | 1/2014 |
| WO | WO 2015/001572 A2 | 1/2015 |
| WO | WO 2015/015702 A1 | 2/2015 |
| WO | WO 2016/027454 A1 | 2/2016 |
| WO | WO 2016/067524 A1 | 5/2016 |

OTHER PUBLICATIONS

FIPS Publication 197, "Advanced Encryption Standard (AES)," Nov. 26, 2001, pp. 1-47.
Granger et al., "Improved Masking for Tweakable Blockciphers with Applications to Authenticated Encryption," pp. 1-39.
International Search Report (PCT/ISA/210) issued in PCT/JP2017/006300, dated May 30, 2017.
Killian et al., How to Protect DES Against Exhaustive Key Search, Lecture Notes in Computer Science, vol. 1109, 1996, pp. 252-267.
Krovetz et al., "The Software Performance of Authenticated-Encryption Modes," Lecture Notes in Computer Science, vol. 6733, 2011, pp. 306-327.
Liskov et al., "Tweakable Block Ciphers," CRYPTO, 2002, pp. 31-46.
Minematsu, "Parallelizable Rate-1 Authenticated Encryption from Pseudorandom Functions," EUROCRYPT, 2014, pp. 1-33.
Notice of Reasons for Refusal issued in Japanese Application No. 2017-561789, dated Mar. 20, 2018.
Rogaway et al., "OCB: a bBock-Cipher Mode of Operation for Efficient Authenticated Encryption," ACM Conference on Computer and Communications Security, 2003, pp. 1-39.
Rogaway, "Efficient Instantiations of Tweakable Blockciphers and Refinements to Modes OCB and PMAC," ASIACRYPT, 2004, pp. 16-31.
Rogaway, "Authenticated-Encryption with Associated-Data," ACM Conference on Computer and Communications Security, Sep. 20, 2002, pp. 1-28.

* cited by examiner

ENCRYPTION DEVICE AND DECRYPTION DEVICE

TECHNICAL FIELD

The present invention relates to an authentication encryption algorithm using a block cipher.

BACKGROUND ART

An authentication encryption algorithm is an encryption algorithm simultaneously having both a concealment function and a tamper detection function. Using the authentication encryption algorithm enables communication between two parties after concealment of a plaintext, and allows a recipient to check whether or not a message transmitted through the communication path has been tampered with.

The authentication encryption algorithm includes two algorithms, an encryption function and a decryption function.

The encryption function is a function that uses a secret key K, an initial parameter N, public data H, and a plaintext M as inputs, to output a ciphertext C and an authenticator T for tamper detection. Meanwhile, a different value is used for the initial parameter N for each encryption.

The decryption function is a function that uses a secret key K, an initial parameter N, a public data H, a ciphertext C, and an authenticator T for tamper detection as inputs, and outputs a plaintext M when the ciphertext C and the like have not been tampered with, but does not output the plaintext when the ciphertext C and the like have been tampered with.

Suppose that a sender Alice and a recipient Bob communicate using the authentication encryption algorithm. In this case, the sender Alice uses the encryption function to calculate a ciphertext C and an authenticator T for tamper detection from a secret key K, an initial parameter N, public data H, and a plaintext M. Then, the sender Alice sends the initial parameter N, the public data H, the ciphertext C, and the authenticator T for tamper detection to the recipient Bob. The recipient Bob uses the secret key K, the initial parameter N, the public data H, the ciphertext C, and the authenticator T for tamper detection as inputs of the decryption function. The decryption function outputs a plaintext M when none of the initial parameter N, the public data H, the ciphertext C, and the authenticator T for tamper detection has been tampered with.

Note that the secret key K is shared in advance by Alice and Bob. Further, the public data H is a value that may be published. The public data H may be absent.

The authentication encryption algorithm is often constructed by a block cipher such as AES of Non Patent Literature 7.

An encryption function E of the block cipher is a function that uses a key $K_E$ of k bits and a plaintext m of n bits as inputs, to output a ciphertext c of n bits. This is written as c=E ($K_E$, m). A decryption function D of the block cipher is a function that uses a key $K_E$ of k bits and a ciphertext c of n bits as inputs, to output a plaintext m of n bits. This is written as m=D ($K_E$, c). A size n of the plaintext m and the ciphertext c of the block cipher is called a block size. When the key $K_E$ is fixed, the encryption function E and the decryption function D of the block cipher become replacement functions of n bits, and become other replacement functions when the key is changed.

In a case of constructing the authentication encryption algorithm by using the block cipher, the public data H and the plaintext M are divided into a block size to be processed by the encryption function E. The divided data of the block size is processed by the encryption function E. This data of the block size is called block data.

Efficiency of the authentication encryption algorithm using the block cipher depends on the number of operations of the block cipher called to process each block data. The efficiency is expressed in a unit called rate, and the efficiency of the authentication encryption algorithm with the number of operations of x times is taken as rate-1/x. The algorithm with the number of operations of x=1, that is, the algorithm with rate-1 is the most efficient.

The authentication encryption algorithm using the block cipher with rate-1 is realized by a construction method using a tweakable block cipher.

This construction method is constituted of step 1 of designing a tweakable block cipher by using the block cipher, and step 2 of designing the authentication encryption algorithm by using the tweakable block cipher. Then, the authentication encryption algorithm is obtained by combining step 1 and step 2.

The tweakable block cipher uses an additional value called a Tweak value of t bits as an input, in addition to the input of the block cipher.

An encryption function TE of the tweakable block cipher is a function that uses a key $K_{TE}$ of k bits, a tweak value TW of t bits, and a plaintext m of n bits as inputs, to output a ciphertext c of n bits. This is written as c=TE ($K_{TE}$, TW, m). A decryption function TD of the tweakable block cipher is a function that uses a key $K_{TE}$ of k bits, a tweak value TW of t bits, and a ciphertext c of n bits as inputs, to output a plaintext m of n bits. This is written as m=TD ($K_{TE}$, TW, c).

The encryption function TE and the decryption function TD of the tweakable block cipher become a replacement function of n bits when the key $K_{TE}$ and the tweak value TW are fixed, and become another replacement function when at least either of the key $K_{TE}$ or the tweak value TW is changed. Similarly to the block cipher, a size n of the plaintext m and the ciphertext c is called a block size also in the tweakable block cipher.

The tweakable block cipher described in Non Patent Literature 1 is used in many authentication encryption algorithms. This tweakable block cipher is called LRW, which uses a block cipher and an almost XOR universal hash function h.

The almost XOR universal hash function is a keyed hash function. Hereinafter, a key of the almost XOR universal hash function is written as $K_h$, and an operation of the almost XOR universal hash function on an input TW is written as h ($K_h$, TW).

The LRW encryption function uses a key K of k bits, a tweak value TW of t bits, and a plaintext m of n bits as inputs, to calculate a ciphertext c of n bits in accordance with Formula 1.

$$c=h(K_h,TW)\oplus E(K_E,m\oplus h(K_h,TW)) \quad \text{[Formula 1]}$$

The LRW decryption function calculates the plaintext m by the inverse of the encryption function, that is, Formula 2.

$$m=h(K_h,TW)\oplus D(K_E,c\oplus h(K_h,TW)) \quad \text{[Formula 2]}$$

The almost XOR universal hash function is a function having a very small probability of satisfying Formula 3 for a key $K_h$, two different input values TW and TW' of the hash function, and any given value y. In general, assuming that an output length of the hash function is n bits, one with this probability of O ($1/2^n$) is used as the almost XOR universal hash function.

$$h(K_h,TW)\oplus h(K_h,TW')=y \quad \text{[Formula 3]}$$

Several algorithms of the almost XOR universal hash function h have been proposed. Non Patent Literature 2 describes a powering-up method using multiplication of 2, 3, and 7 on a Galois field. In the powering-up method, calculation can be performed very efficiently by combining shift and exclusive OR. Further, Non Patent Literature 3 and Non Patent Literature 4 describe a gray-code method, and Non Patent Literature 5 and Non Patent Literature 6 describe a linear feedback shift register (LFSR) method.

In the authentication encryption algorithm using LRW, an initial parameter N and an internal parameter ctr are used as tweak values in internal calculation, and the initial parameter N and the internal parameter ctr are used as inputs to an almost XOR universal hash function.

The initial parameter N is a value different for each encryption. The internal parameter ctr is a parameter used inside the authentication encryption algorithm, and a different value is used every time the tweakable block cipher is called in one operation of the encryption function or in one operation of the decryption function. That is, the input value of the almost XOR universal hash function is a different value for each block cipher called by the encryption function of the authentication encryption algorithm, and the output value is also a different value.

Patent Literatures 1, 2, 3, 4, and 5 and Non Patent Literatures 2, 3, 4, 8, and 9 describe an authentication encryption algorithm of rate-1 using LRW.

Security of the authentication encryption algorithm is evaluated by an upper bound value of the probability that the safety is broken, by using the number of operations of the block cipher called within the algorithm, the number of calls of the encryption function or the decryption function of the authentication encryption algorithm, and a block length. This upper bound value is written as $\varepsilon$.

As illustrated in Non Patent Literature 1, assuming that the total number of calls of the block cipher called within the authentication encryption algorithm is $\sigma$, $\varepsilon = O(\sigma^2/2^n)$ in the authentication encryption algorithm of rate-1 using LRW. This probability is called birthday bound.

When the authentication encryption algorithm is implemented, key update is performed before $\varepsilon = 1$ is reached, in order to ensure security. For example, in the authentication encryption algorithm using LRW, key update is performed before $\sigma = \sigma^{n/2}$ is reached.

CITATION LIST

Patent Literature

Patent Literature 1: US 2013/0,077,780 A
Patent Literature 2: U.S. Pat. No. 8,321,675
Patent Literature 3: U.S. Pat. No. 7,949,129
Patent Literature 4: US 2002/0,071,552 A
Patent Literature 5: WO 2015/15702 A Non Patent Literature Non Patent Literature 1: Moses Liskov, Ronald L. Rivest, and David Wagner. Tweakable Block Ciphers. CRYPTO 2002. p 31-46.
Non Patent Literature 2: Phillip Rogaway. Efficient Instantiations of Tweakable Blockciphers and Refinements to Modes OCB and PMAC. ASIACRYPT 2004. p 16-31.
Non Patent Literature 3: Phillip Rogaway, Mihir Bellare, John Black, and Ted Krovetz. OCB: a block-cipher mode of operation for efficient authenticated encryption. ACM Conference on Computer and Communications Security 2001. p 196-205.
Non Patent Literature 4: Ted Krovetz and Phillip Rogaway. The Software Performance of Authenticated-Encryption Modes. FSE 2011. p 306-327.
Non Patent Literature 5: Robert Granger, Philipp Jovanovic, Bart Mennink, and Samuel Neves. Improved Masking for Tweakable Blockciphers with Applications to Authenticated Encryption. EUROCRYPT 2016 Part I. p 263-293.
Non Patent Literature 6: Debrup Chakraborty and Palash Sarkar. A General Construction of Tweakable Block Ciphers and Different Modes of Operations. IEEE Trans. Information Theory 54(5). p 1991-2006.
Non Patent Literature 7: FIPS 197, Advanced Encryption Standard (AES) Non Patent Literature 8: Kazuhiko Minematsu. Parallelizable Rate-1 Authenticated Encryption from Pseudorandom Functions. EUROCRYPT 2014. p 275-292.
Non Patent Literature 9: Phillip Rogaway. Authenticated-encryption with associated-data. ACM Conference on Computer and Communications Security 2002. p 98-107.

SUMMARY OF INVENTION

Technical Problem

Since key update requires cost, it is desirable to reduce the frequency of key update. In addition, in order to increase in speed of the authentication encryption algorithm, the number of operations of the block cipher called in the Tweakable block cipher operation is desirably a minimum number, that is, one.

An object of the present invention is to make it possible to construct an encryption algorithm in which an upper bound value E is smaller than a birthday bound, and the number of operations of the block cipher called in the Tweakable block cipher operation is one.

Solution to Problem

An encryption device in authentication encryption according to the present invention includes:
a key generation unit to generate a key K of an encryption function E of a block cipher, in accordance with an initial parameter N;
a hash calculation unit to calculate a hash value msk with an internal parameter ctr as an input; and
an encryption unit to generate a ciphertext c of the message m by using the encryption function E, with the key K generated by the key generation unit, the hash value msk calculated by the hash calculation unit, and a message m as inputs.

Advantageous Effects of Invention

In the present invention, a key K of an encryption function E is generated in accordance with an initial parameter N. This causes the key K of the encryption function E to change in accordance with the initial parameter N. Therefore, estimation of the key K becomes difficult, the upper bound values becomes smaller than the birthday bound, and the number of operations of the block cipher called in the Tweakable block cipher operation can be one.

DESCRIPTION OF EMBODIMENTS

First Embodiment

*Description of Configuration*

Figure 1:
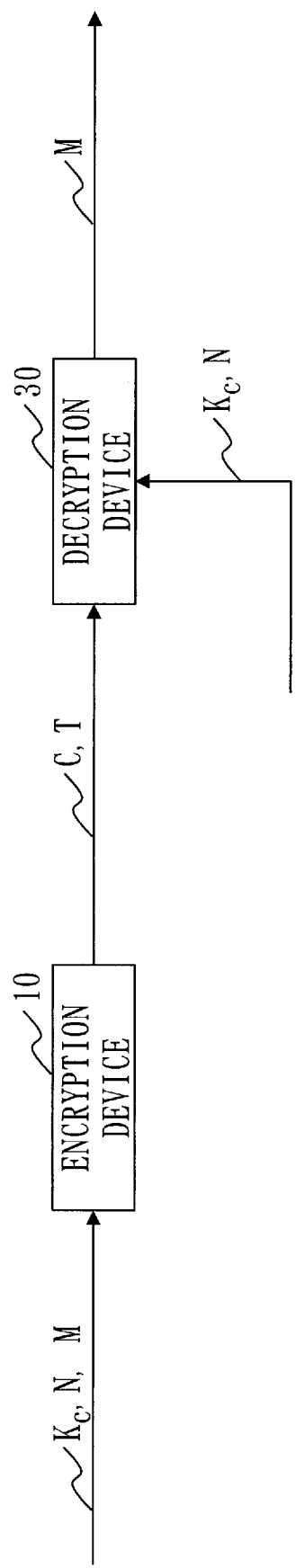
FIG. 1 is a configuration diagram of an encryption system 1 according to a first embodiment.

With reference to FIG. 1, a configuration of an encryption system 1 according to a first embodiment will be described.

The encryption system 1 includes one or more encryption devices 10 and one or more decryption devices 30. The encryption device 10 and the decryption device 30 are connected via a network and can communicate with each other.

One device may have functions of both the encryption device 10 and the decryption device 30.

The encryption device 10 generates a ciphertext C and an authenticator T, with a key $K_c$, an initial parameter N, and a message M as inputs. The encryption device 10 transmits the ciphertext C and the authenticator T to the decryption device 30. The decryption device 30 generates a message M in which the ciphertext C is decrypted, with the ciphertext C and the authenticator T transmitted from the encryption device 10, the key $K_c$, and the initial parameter N as inputs. Further, the decryption device 30 determines whether or not the message M has been tampered with. When the message M has not been tampered with, the decryption device 30 outputs the message M.

Figure 2:
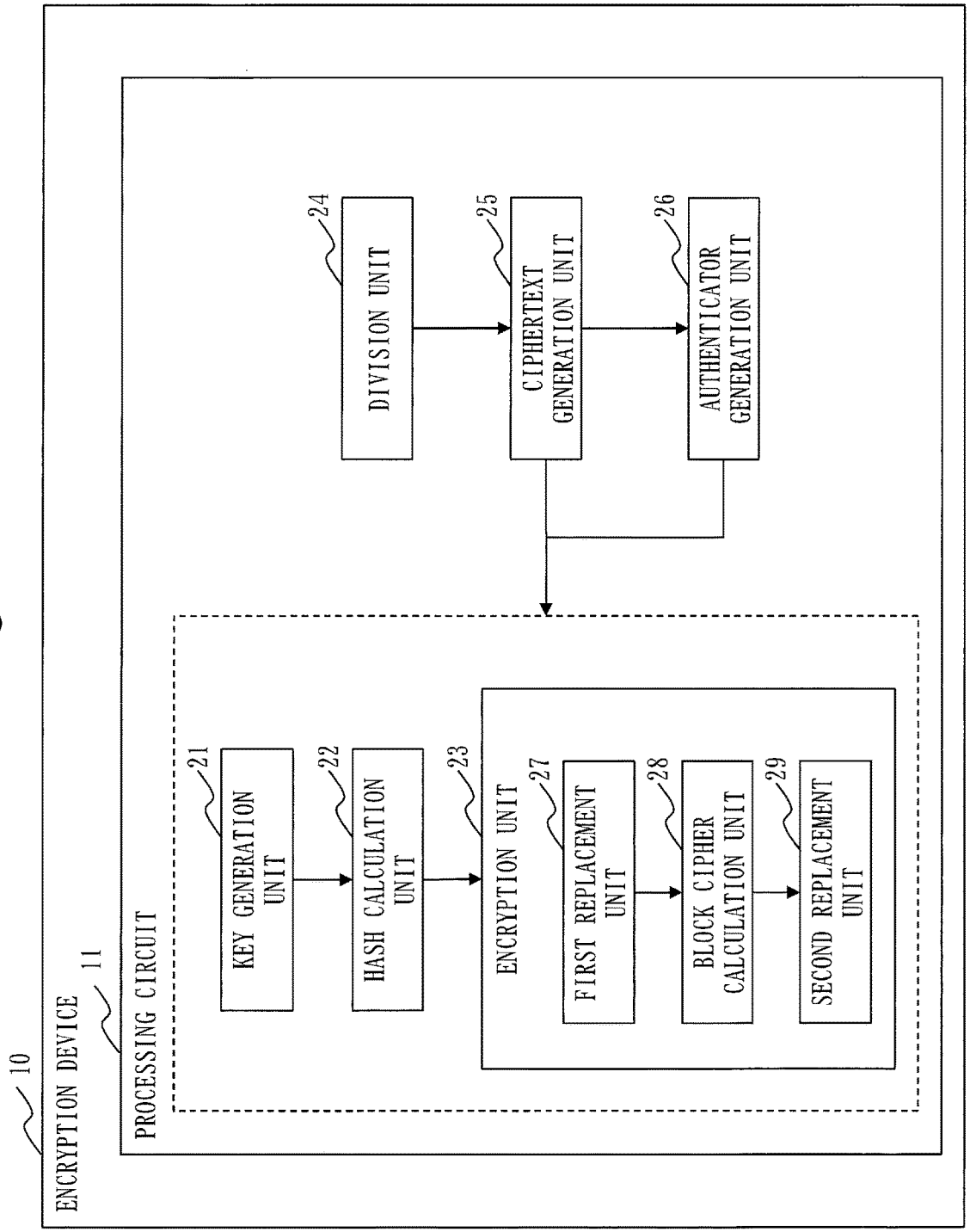
FIG. 2 is a configuration diagram of an encryption device 10 according to the first embodiment.

With reference to FIG. 2, a configuration of the encryption device 10 according to the first embodiment will be described.

The encryption device 10 includes a processing circuit 11. The processing circuit 11 includes a key generation unit 21, a hash calculation unit 22, an encryption unit 23, a division unit 24, a ciphertext generation unit 25, and an authenticator generation unit 26. The encryption unit 23 includes a first replacement unit 27, a block cipher calculation unit 28, and a second replacement unit 29. The processing circuit 11 is a dedicated electronic circuit that realizes each function of the key generation unit 21, the hash calculation unit 22, the encryption unit 23, the division unit 24, the ciphertext generation unit 25, the authenticator generation unit 26, the first replacement unit 27, the block cipher calculation unit 28, and the second replacement unit 29.

Figure 3:
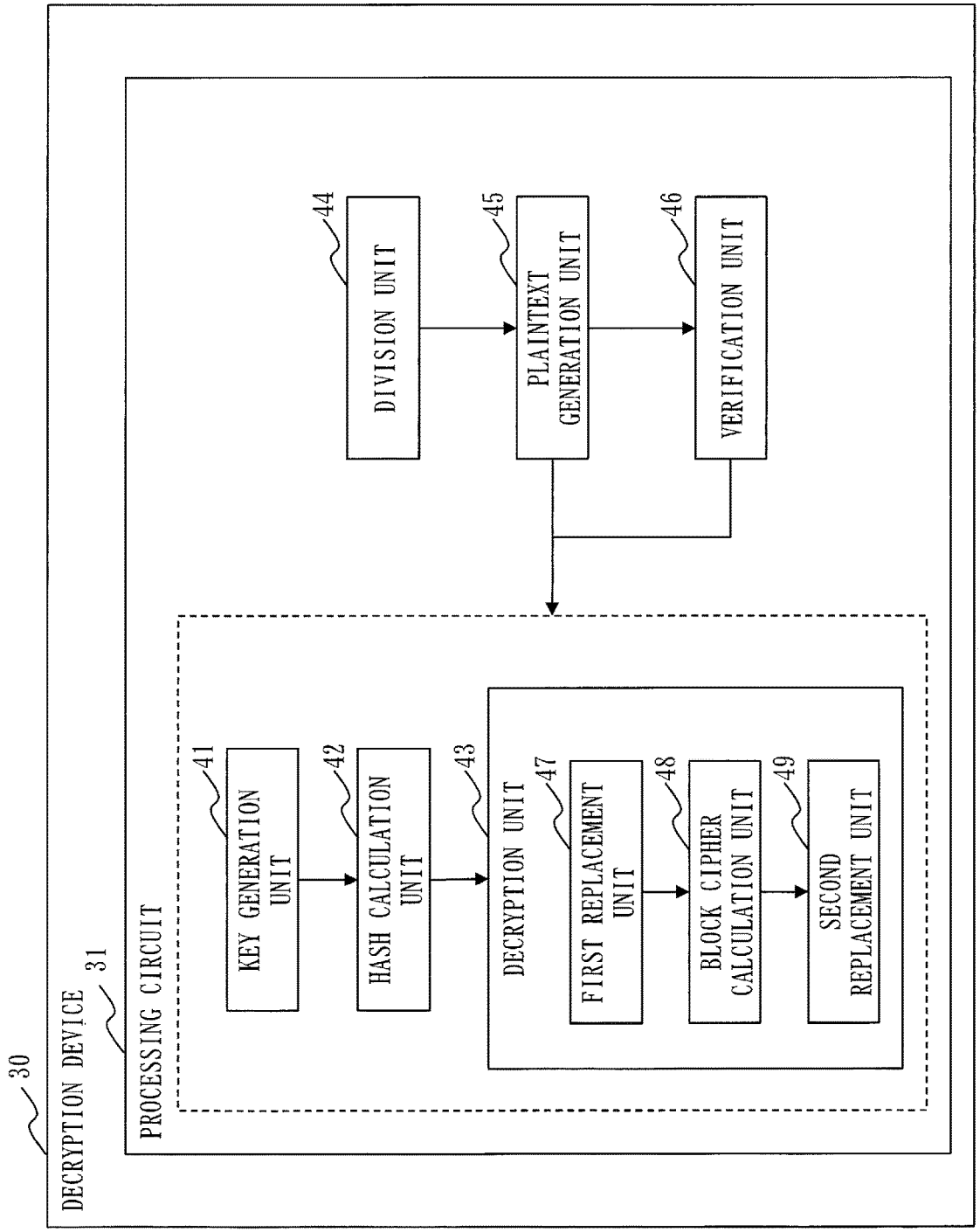
FIG. 3 is a configuration diagram of a decryption device 30 according to the first embodiment.

With reference to FIG. 3, a configuration of the decryption device 30 according to the first embodiment will be described.

The decryption device 30 includes a processing circuit 31. The processing circuit 31 includes a key generation unit 41, a hash calculation unit 42, a decryption unit 43, a division unit 44, a plaintext generation unit 45, and a verification unit 46. The decryption unit 43 includes a first replacement unit 47, a block cipher calculation unit 48, and a second replacement unit 49. The processing circuit 31 is a dedicated electronic circuit that realizes each function of the key generation unit 41, the hash calculation unit 42, the decryption unit 43, the division unit 44, the plaintext generation unit 45, the first replacement unit 47, the block cipher calculation unit 48, and the second replacement unit 49.

For the processing circuits 11 and 31, a single circuit, a composite circuit, a programmed processor, a parallel programmed processor, a logic integrated circuit (IC), a gate array (GA), an application specific integrated circuit (ASIC), or a field-programmable gate array (FPGA) is assumed.

Each function may be realized by one processing circuit 11 or processing circuit 31, or each function may be distributed to and realized by a plurality of processing circuits 11 or a plurality of processing circuits 31.

Information, data, signal values, and variable values indicating a result of processing of each function realized by the processing circuits 11 and 31 are stored in a storage area such as a register in the processing circuits 11 and 31.

*Description of Operation*

With reference to FIGS. 4 to 20, an operation of the encryption system 1 according to the first embodiment will be described.

An operation of the encryption device 10 according to the first embodiment corresponds to an encryption method according to the first embodiment. Further, the operation of the encryption device 10 according to the first embodiment corresponds to processing of an encryption program according to the first embodiment.

An operation of the decryption device 30 according to the first embodiment corresponds to a decryption method according to the first embodiment. Further, the operation of the decryption device 30 according to the first embodiment corresponds to processing of a decryption program according to the first embodiment.

The encryption system 1 according to the first embodiment realizes an authentication encryption algorithm by using a tweakable block cipher. The tweakable block cipher used by the encryption system 1 according to the first embodiment is a scheme that uses an encryption function E and a decryption function D of the block cipher having a key of k bits and a block size of n bits, and is given with an initial parameter N and an internal parameter ctr as a Tweak value.

In the following description, the entire space that can be taken by the initial parameter N is defined as Set (N), and the entire space that can be taken by the internal parameter ctr is defined as Set (ctr). The initial parameter N and the internal parameter ctr may be published.

With reference to FIGS. 4 to 11, the tweakable block cipher used by the encryption system 1 according to the first embodiment will be described.

Figure 4:
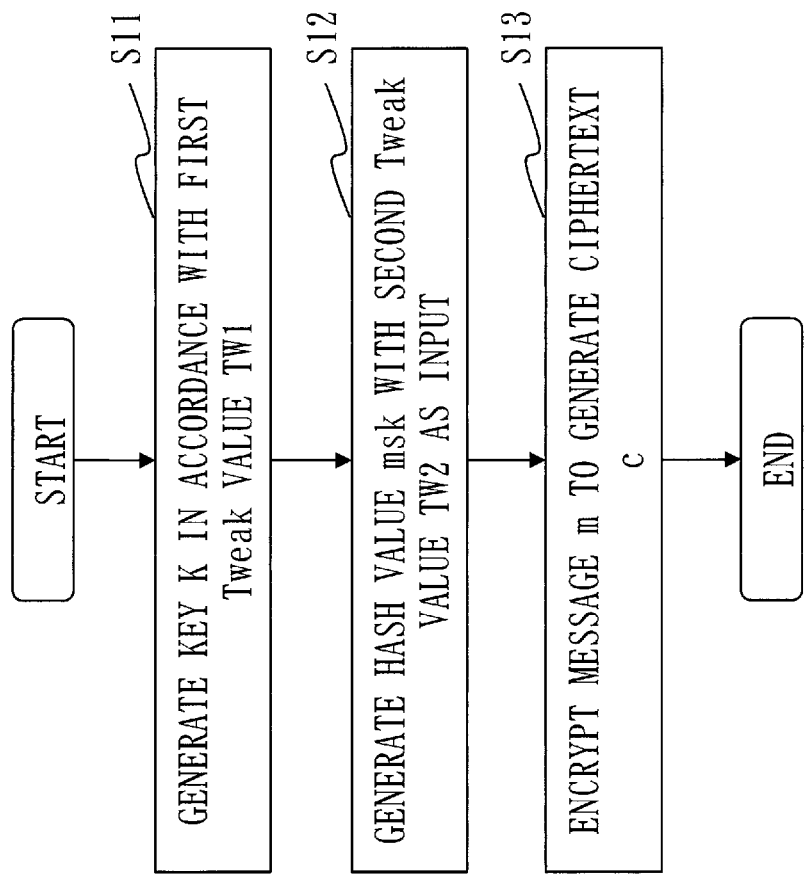
FIG. 4 is a flowchart of an encryption function TE of a tweakable block cipher used by the encryption system 1 according to the first embodiment.

With reference to FIG. 4, an encryption function TE of the tweakable block cipher used by the encryption system 1 according to the first embodiment will be described.

(Step S11: Key Generation Process)

The key generation unit 21 receives an input of a first Tweak value TW1. The key generation unit 21 generates a key K of k bits of the encryption function E in accordance with the first Tweak value TW1. Note that the first Tweak value TW1 is the initial parameter N in the authentication encryption algorithm. Therefore, the key generation unit 21 generates the key K of k bits of the encryption function E in accordance with the initial parameter N, in the authentication encryption algorithm.

Specifically, the key generation unit 21 uses a keyed function f, which outputs a set of k-bit values $\{0, 1\}^k$ with the first Tweak value TW1 and a key $K_f$ of k bits as inputs. The key generation unit 21 uses the key $K_f$ shared in advance between with the decryption device 30 and the first Tweak value TW1 as inputs, to generate a key K of k bits by the keyed function f.

As the keyed function f, a function such as an almost universal hash function or a pseudo-random function can be used.

The almost universal hash function is a function in which the probability of f ($K_f$, TW1)=f ($K_f$, TW1') is very small for the key $K_f$ and two different input values TW1 and TW1', and the probability of f ($K_f$, TW1)=y is very small for the key $K_f$, the input value TW1, and the value y of k bits. Specifically, it is desirable to use a function having these probabilities of equal to or less than O ($½^n$).

The keyed function f may be a function in which E ($K_f$, 0∥TW1), E ($K_f$, 1∥TW1), ..., E ($K_f$, (i−1)∥TW1) are combined, and a predetermined k bits among them are used as the key K. Note that ∥ is an operator representing a bit combination. For example, 000∥111 is equal to a bit string 000111. Alternatively, the keyed function f may be a function with an exclusive OR of the key $K_f$ and the first Tweak value TW1 as the key K. However, in this case, the first Tweak value TW1 is a value of k bits, and is a value other than $0^k$ (k-bit string of 0). Further, the keyed function f may be a function in which E ($K_f$, 0∥TW1) xor E ($K_f$, 1∥TW1), ..., E ($K_f$, 0∥TW1) xor E ($K_f$, 1∥TW1) are combined, and a predetermined k bits amount them are used as the key K. Note that j∥TW1 is a value of n bits. A bit length of j is a length capable of representing values from 0 to i in binary notation, and a length of TW1 is the remaining bit length.

(Step S12: Hash Calculation Process)

The hash calculation unit 22 receives an input of a second Tweak value TW2. The hash calculation unit 22 uses, as inputs, an internal parameter ctr and a key $K_h$ of k bits shared in advance between with the decryption device 30, to calculate a hash value msk of n bits by the hash function h. Note that the second Tweak value TW2 is the internal parameter ctr in the authentication encryption algorithm.

The hash function h is a function that outputs a set of n-bit values $\{0, 1\}^n$, with the second Tweak value TW2 and the key $K_h$ as inputs. Specifically, the hash function h is an almost XOR universal hash function. For example, as the hash function h, it is possible to use the powering-up method described in Patent Literature 2, the gray-code method described in Patent Literatures 3 and 4, the LFSR method described in Non Patent Literature 5, and the like.

Not that the key $K_f$ of the function f and the key $K_h$ of the function h may be the same or different. Meanwhile, here, the hash function h does not use the initial parameter N as an input. However, the hash function h may use the initial parameter N as an input.

(Step S13: Encryption Processing)

The encryption unit 23 uses, as inputs, the key K generated by the key generation unit 21 in step S11, the hash value msk calculated by the hash calculation unit 22 in step S12, and a message m, to generate a ciphertext c of the message m by using the encryption function E.

There are two types of encryption process, a first encryption process and a second encryption process. In the authentication encryption algorithm described later, in principle, a first authentication process is used. When the decryption function TD is not used for decryption of the message m, the second encryption process can be used instead of the first encryption process.

Figure 5:
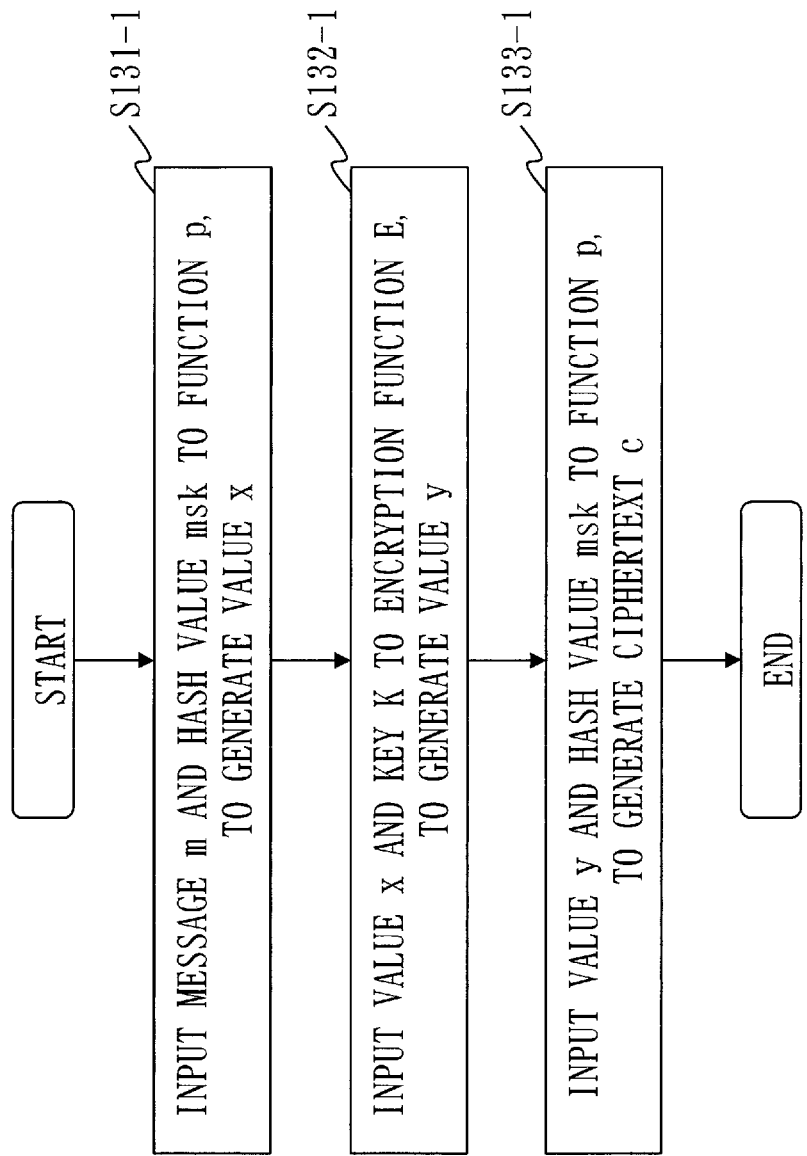
FIG. 5 is a flowchart of a first encryption process according to the first embodiment.
Figure 6:
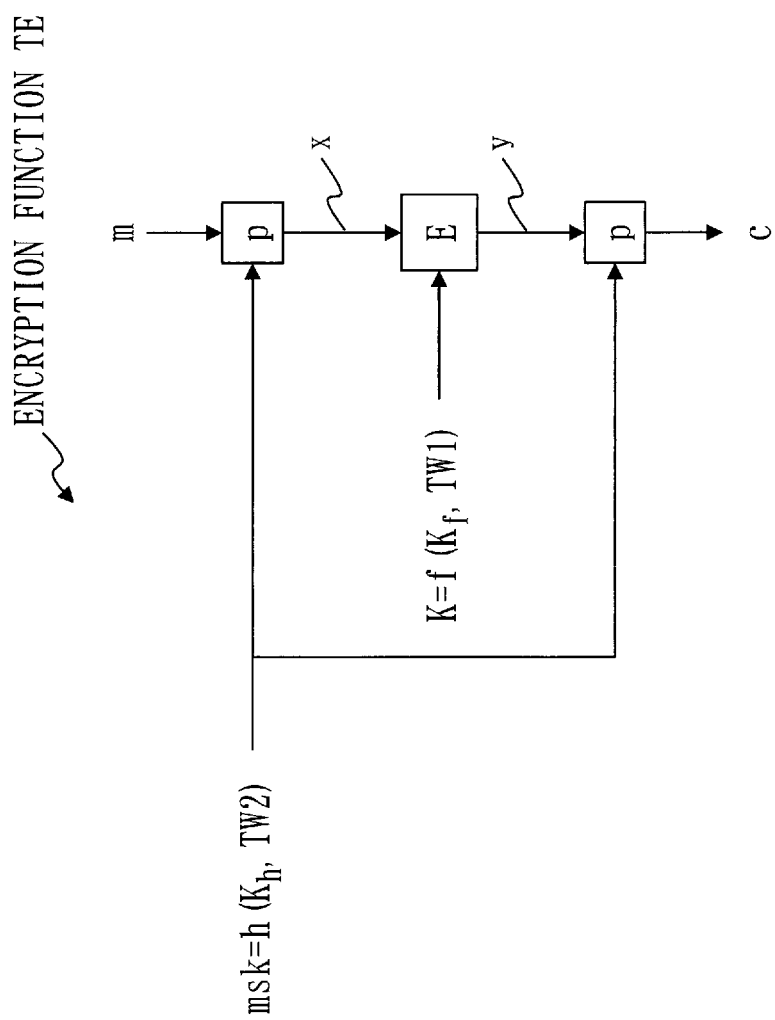
FIG. 6 is an explanatory diagram of the encryption function TE in a case of using the first encryption process according to the first embodiment.

With reference to FIGS. 5 and 6, the first encryption process according to the first embodiment will be described.

(Step S131-1: First Replacement Process)

The first replacement unit 27 inputs the hash value msk calculated in step S12 and the message m to a function p, to calculate a value x.

The function p is a function that uses the hash value msk and an n-bit value α as inputs, to output an n-bit value β. The function p is a function in which, when the hash value msk is fixed, the value α and the value β have a relation of replacement. As a specific example, the function p is a function that calculates an exclusive OR of two input values. That is, in a case of u=p (v, w), u is a value obtained by calculating an exclusive OR of v and w. Further, as another specific example, the function p is a function that adds bits of two values. That is, in a case of u=p (v, w), u is a value obtained by adding n bits of v and w.

(Step S132-1: Block Encryption Calculation Process)

The block cipher calculation unit 28 uses the value x calculated by the first replacement unit 27 in step S131-1 and the key K calculated in step S11 as inputs, to calculate a value y by the encryption function E.

(Step S133-1: Second Replacement Process)

The second replacement unit 29 inputs, to the function p, the hash value msk calculated in step S12 and the value y calculated by the block cipher calculation unit 28 in step S132-1, to calculate a ciphertext c. The function p is the function described in step S131-1.

Figure 7:
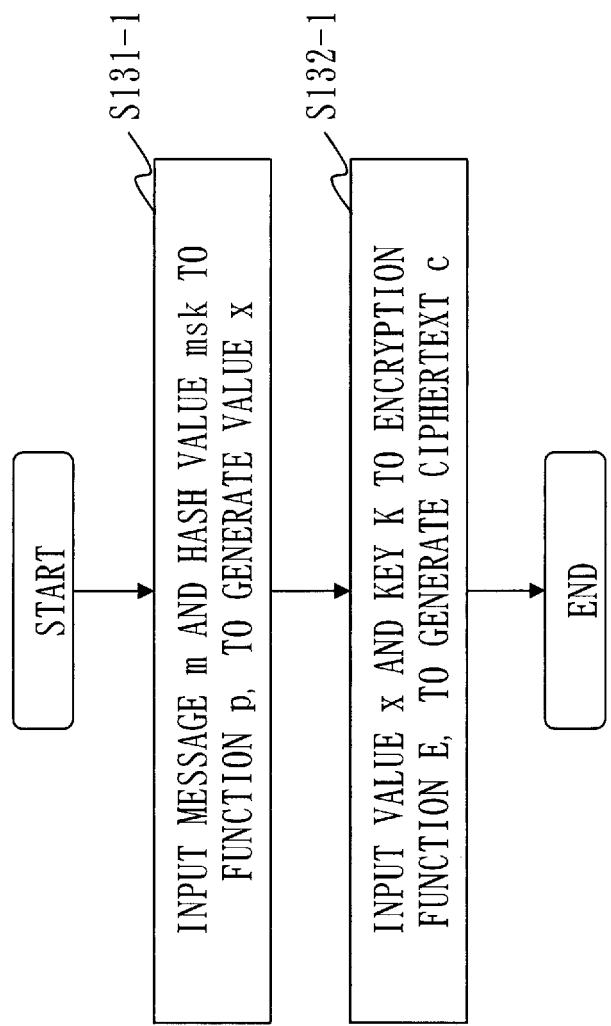
FIG. 7 is a flowchart of a second encryption process according to the first embodiment.
Figure 8:
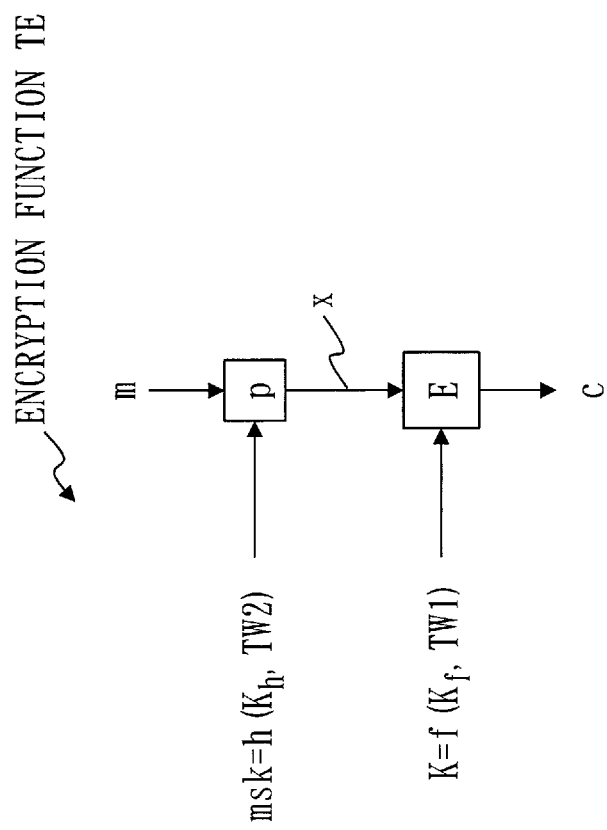
FIG. 8 is an explanatory diagram of the encryption function TE in a case of using the second encryption process according to the first embodiment.

With reference to FIGS. 7 and 8, the second encryption process according to the first embodiment will be described.

Processing of steps S131-2 to S132-2 is the same as processing of steps S131-1 to S132-1 of FIG. 5. However, in step S132-2, the block cipher calculation unit 28 handles the value y as the ciphertext c.

That is, the second encryption process is different from the first encryption process in that the second replacement process is not performed.

Figure 9:
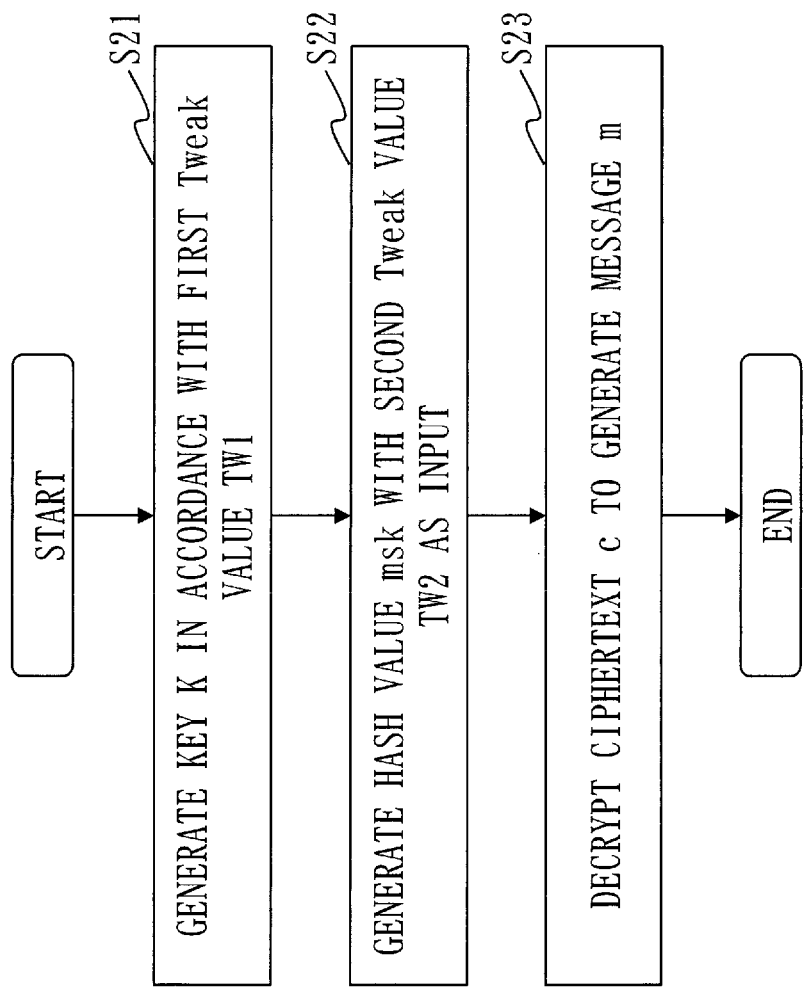
FIG. 9 is a flowchart of a decryption function TD of a tweakable block cipher used by the encryption system 1 according to the first embodiment.

With reference to FIG. 9, the decryption function TD of the tweakable block cipher used by the encryption system 1 according to the first embodiment will be described.

(Step S21: Key Generation Process)

The key generation unit 41 receives an input of a first Tweak value TW1. The key generation unit 41 generates a key K of k bits of the encryption function E in accordance with the first Tweak value TW1, by the same method as in step S11 in FIG. 4.

(Step S22: Hash Calculation Process)

The hash calculation unit 42 receives an input of a second Tweak value TW2. The hash calculation unit 42 uses the second Tweak value TW2 as an input, to calculate a hash value msk of n bits by the hash function h by the same method as in step S12 of FIG. 4.

(Step S23: Decryption Process)

The decryption unit 43 uses, as inputs, the key K generated by the key generation unit 41 in step S21, the hash value msk calculated by the hash calculation unit 42 in step S22, and a ciphertext c, to decrypt the ciphertext c by using the decryption function D to generate a message m.

Figure 10:
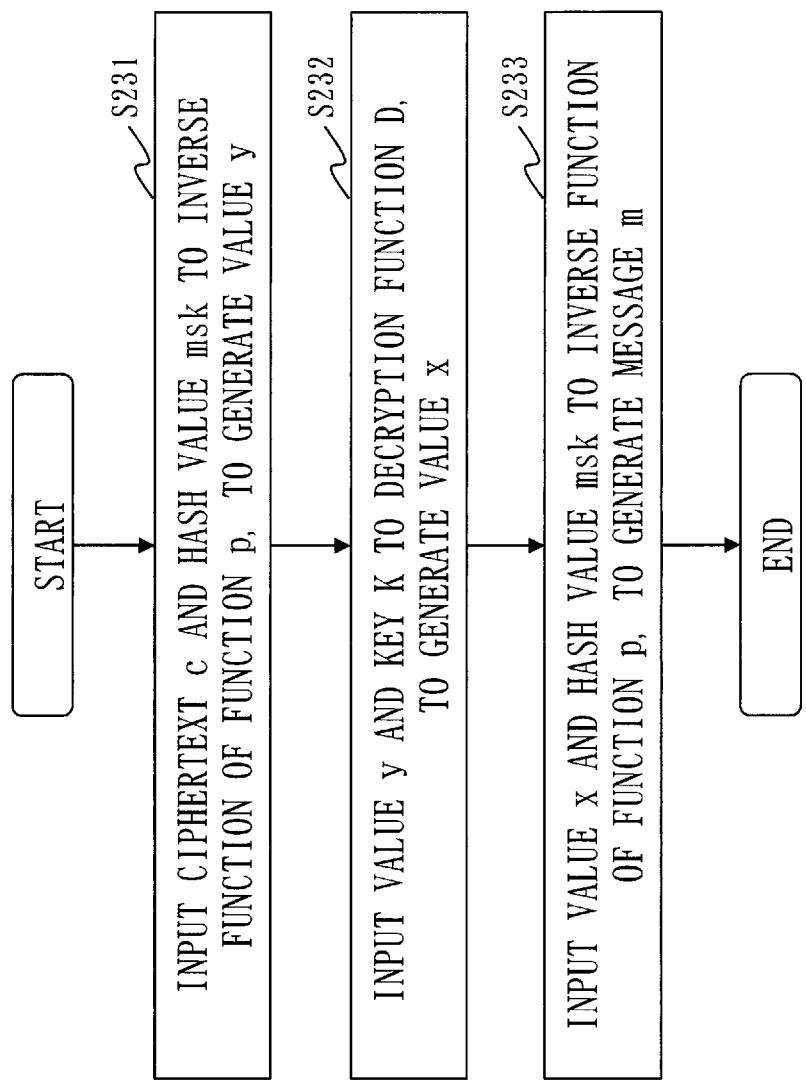
FIG. 10 is a flowchart of a decryption process according to the first embodiment.
Figure 11:
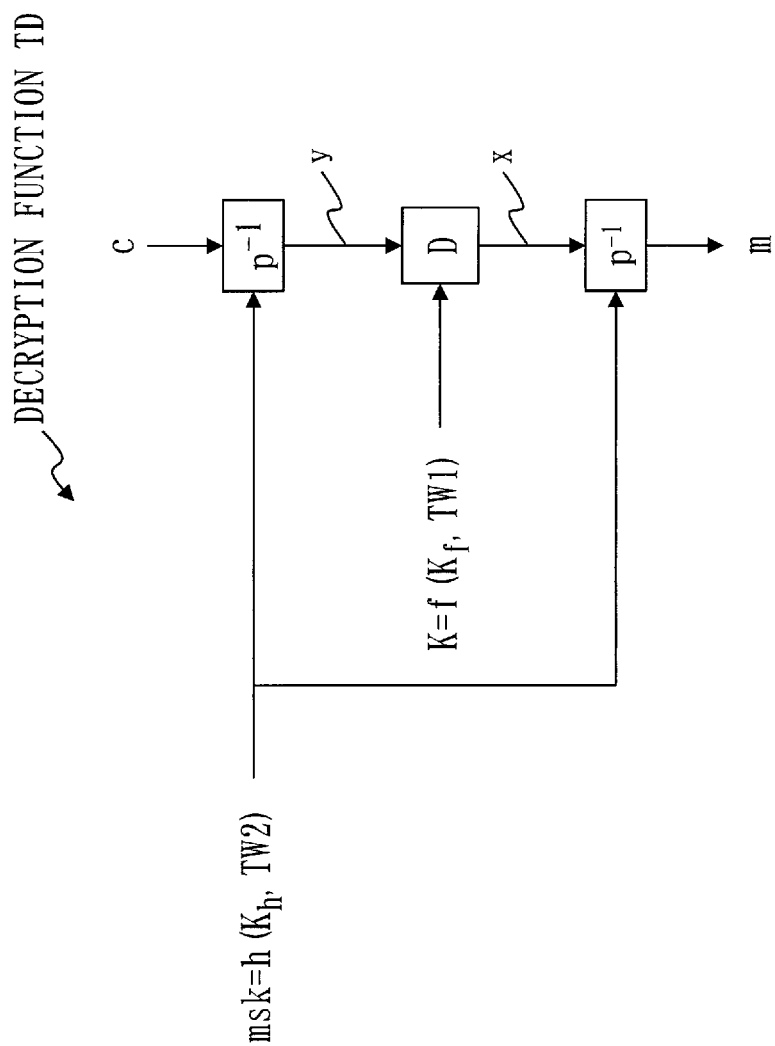
FIG. 11 is an explanatory diagram of the decryption function TD according to the first embodiment.

With reference to FIGS. 10 and 11, the decryption process according to the first embodiment will be described.

(Step S231: First Replacement Process)

The first replacement unit 47 inputs the hash value msk calculated in step S22 and the ciphertext c to an inverse function $p^{-1}$ of the function p used in step S133-1, to calculate a value y.

(Step S232: Block Encryption Calculation Process)

The block cipher calculation unit 48 uses, as inputs, the value y calculated by the first replacement unit 47 in step S231 and the key K calculated in step S21, to calculate a value x by the decryption function D.

(Step S233: Second Replacement Process)

The second replacement unit 49 inputs, to the inverse function $p^{-1}$ of the function p used in step S131-1, the hash value msk calculated in step S22 and the value x calculated by the block cipher calculation unit 48 in step S232, to calculate a message m.

With reference to FIGS. 12 to 20, the authentication encryption algorithm realized by the encryption system 1 according to the first embodiment will be described.

The authentication encryption algorithm includes a first encryption algorithm, a first decryption algorithm, a second encryption algorithm, a second decryption algorithm, an authenticator generation algorithm, and a verification algorithm.

The first encryption algorithm is an encryption algorithm in a case where the message M is a multiple of n bits. The first decryption algorithm is a decryption algorithm in a case where the ciphertext C is a multiple of n bits. The second encryption algorithm is an encryption algorithm in a case where the message M is not a multiple of n bits. The second decryption algorithm is a decryption algorithm in a case where the ciphertext C is not a multiple of n bits. The authenticator generation algorithm is an algorithm for generating an authenticator T of the message M. The verification algorithm is an algorithm for verifying the authenticator T.

The first encryption algorithm, the second encryption algorithm, and the authenticator generation algorithm are executed by the encryption device 10. Further, the first decryption algorithm, the second decryption algorithm, and the verification algorithm are executed by the decryption device 30.

The encryption device 10 generates a ciphertext C and an authenticator T, with a key $K_c$, an initial parameter N, and a message M as inputs. Specifically, the encryption device 10 generates the ciphertext C by the first encryption algorithm or the second encryption algorithm, and generates the authenticator T by the authenticator generation algorithm. Then, the encryption device 10 transmits the ciphertext C and the authenticator T to the decryption device 30.

The decryption device 30 uses, as inputs, the ciphertext C and the authenticator T transmitted from the encryption device 10, a key $K_c$, and an initial parameter N, to generate a message M in which the ciphertext C is decrypted, and determines whether or not the message M has been tampered with. Specifically, the decryption device 30 generates a message M by the first decryption algorithm or the second decryption algorithm, and determines, by the verification algorithm, whether or not the message M has been tampered with.

In the following description, it is assumed that the key $K_f$ of the function f and the key $K_h$ of the function h are the same, and key $K_f$=key $K_h$=key $K_c$ is satisfied.

Processing for generating the ciphertext c by the encryption function TE using the first encryption process with the key $K_c$, the initial parameter N, the internal parameter ctr, and the message m as inputs is written as c=TEp (K, (N, ctr), m). Further, processing for generating the ciphertext c by the encryption function TE using the second encryption process with the key $K_c$, the initial parameter N, the internal parameter ctr, and the message m as inputs is written as c=TEp' (K, (N, ctr), m). In addition, processing for generating the message m by the decryption function TD with the key $K_c$, the initial parameter N, the internal parameter ctr, and the ciphertext c as inputs is written as m=TDp (K, (N, ctr), c).

A value Nc is to be a fixed value of Set (N). The value const and the value $const_{auth}$ are to be a fixed values of n bits. An internal parameter ctr [b, c] is to be a fixed value. In a case where (b, c) is different from (b', c'), the internal parameter ctr [b, c] and an internal parameter ctr [b', c'] are to be different fixed values. Further, an internal parameter ctr' [b, c] is also to be a fixed value similar to the internal parameter ctr [b, c].

Figure 12:
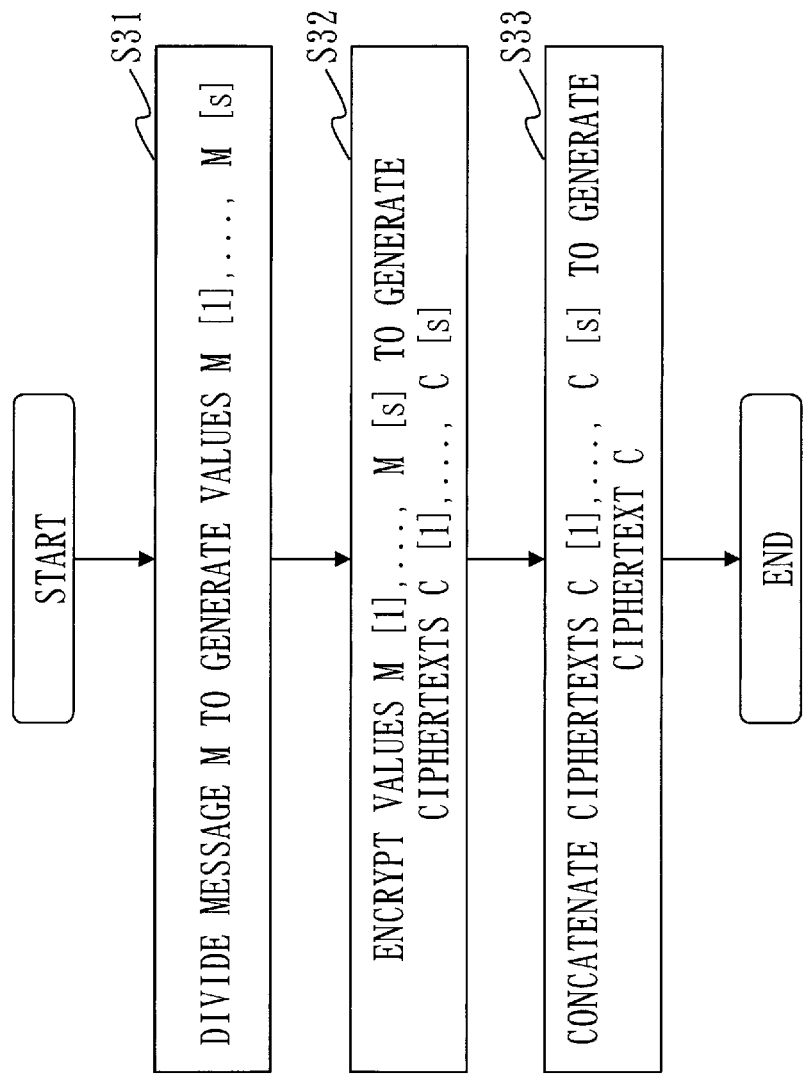
FIG. 12 is a flowchart of a first encryption algorithm according to the first embodiment.
Figure 13:
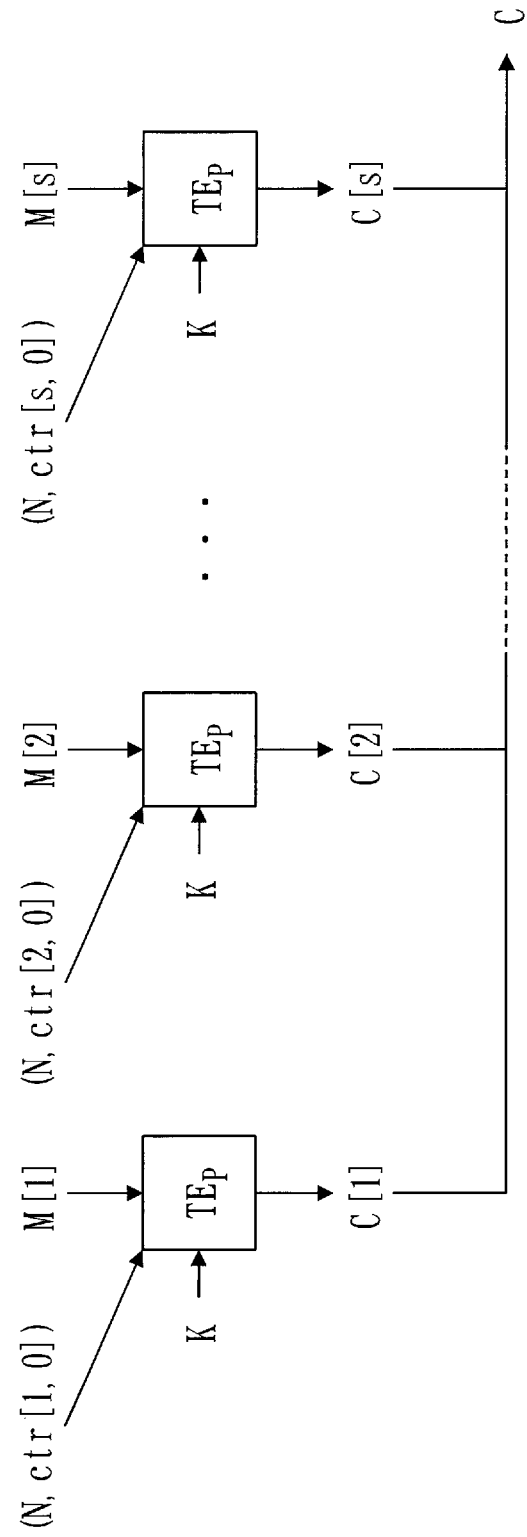
FIG. 13 is an explanatory diagram of the first encryption algorithm according to the first embodiment.

With reference to FIGS. 12 and 13, the first encryption algorithm according to the first embodiment will be described.

(Step S31: Division Process)

The division unit 24 receives an input of a message M to be encrypted. The division unit 24 divides the message M for every n bits from the beginning, to generate a value M [1], . . . , value M [s] of n bits.

(Step S32: Encryption Element Generation Process)

The ciphertext generation unit 25 causes the encryption unit 23 to generate a ciphertext c as a ciphertext C [i] of a value M [i], by inputting the value M [i] generated by the division unit 24 in step S31 as a message m for each integer i of i=1, s.

Specifically, the ciphertext generation unit 25 inputs, for each integer i of i=1, s, the value M [i] generated by the division unit 24 in step S31 as the message m, a key $K_c$ as the key $K_f$ and the key $K_h$, an initial parameter N as the first Tweak value TW1, and an internal parameter ctr [i, 0] as the second Tweak value TW2, to the key generation unit 21, the hash calculation unit 22, and the encryption unit 23. Then, for each integer i of i=1, s, the ciphertext generation unit 25 causes the key generation unit 21, the hash calculation unit 22, and the encryption unit 23 to execute the encryption function TE described with reference to FIG. 4, with the value M [i], the key $K_c$, the initial parameter N, and the internal parameter ctr [i, 0] as inputs. At this time, the first encryption process is used as the encryption process in step S13 of FIG. 4. Then, the ciphertext generation unit 25 handles the generated ciphertext c as the ciphertext C [i].

That is, for each integer i of i=1, s, C [i]=TEp ($K_c$, (N, ctr [i, 0]), M [i]).

The key $K_C$ is a k-bit key shared in advance by the encryption device 10 and the decryption device 30. The initial parameter N is a value selected from Set (N) every time step S32 is executed.

Note that the initial parameter N used in step S32 is a common value for each integer i of i=1, s. Therefore, the encryption function TE illustrated in FIG. 4 is executed for each integer i of i=1, s, but generation of the key K in step S11 of FIG. 4 is required to be executed only for a certain integer i. That is, in a case where the key K is generated by the encryption function TE executed for a certain integer i, the generated key K may be used in the encryption function TE executed for another integer i.

For example, suppose that the key K is generated at a time of generating the ciphertext C [1] of the value M [1]. In this case, it is not necessary to generate the key K again when generating the ciphertext C [2], . . . , ciphertext C [s] of the remaining value M [2], . . . , value M [s], and it is sufficient to use the key K generated when generating the ciphertext C [1] of the value M [1].

(Step S33: Ciphertext Generation Process)

The ciphertext generation unit 25 generates a ciphertext C of the message M by concatenating a ciphertext C [i] for each integer i of i=1, s.

That is, C=C [1]||C [2]|| . . . ||C [s].

Figure 14:
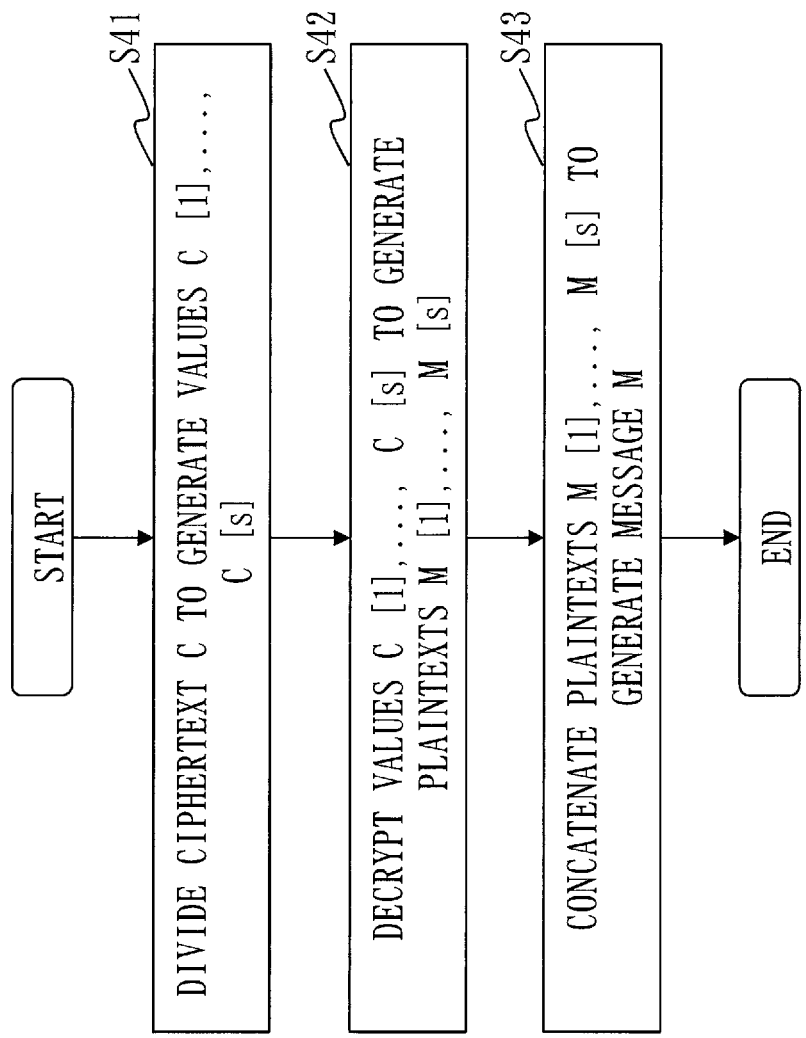
FIG. 14 is a flowchart of a first decryption algorithm according to the first embodiment.
Figure 15:
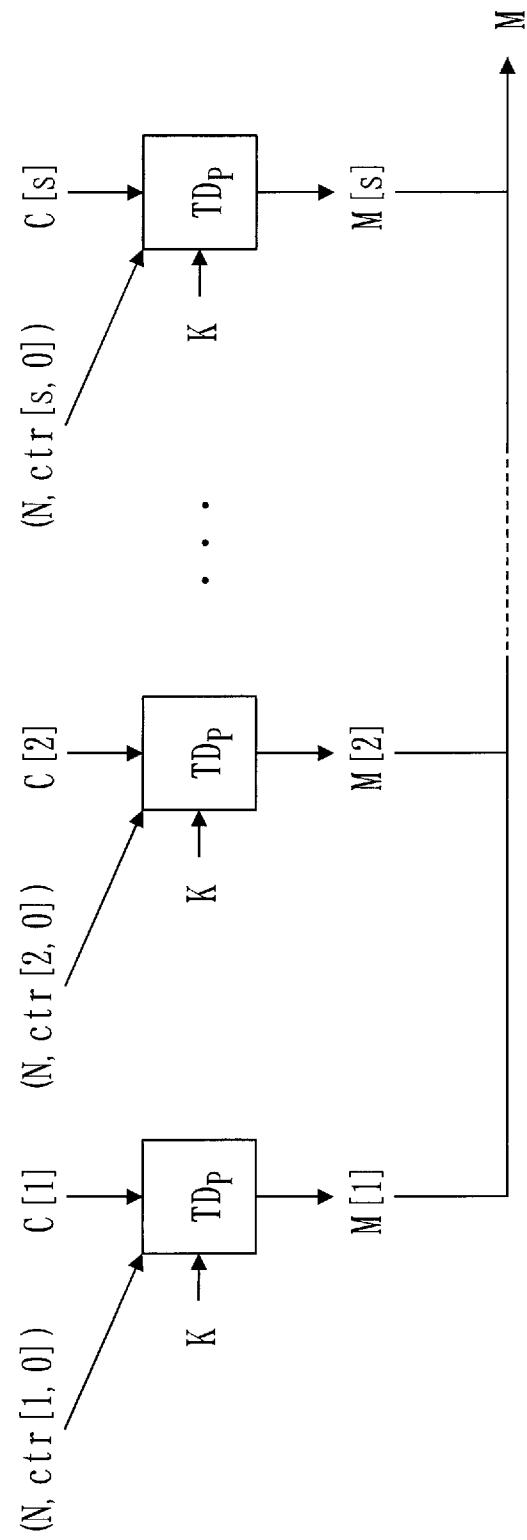
FIG. 15 is an explanatory diagram of the first decryption algorithm according to the first embodiment.

With reference to FIGS. 14 and 15, the first decryption algorithm according to the first embodiment will be described.

(Step S41: Division Process)

The division unit 44 receives an input of a ciphertext C to be decrypted. The division unit 44 divides the ciphertext C for every n bits from the beginning, to generate a value C [1], . . . , value C [s] of n bits.

(Step S42: Plaintext Element Generation Process)

The plaintext generation unit 45 causes the decryption unit 43 to generate a message m as a plaintext M [i] in which a value C [i] is decrypted, by inputting the value C [i] generated by the division unit 44 in step S41 as a ciphertext c for each integer i of i=1, . . . s.

Specifically, the plaintext generation unit 45 inputs, for each integer i of i=1, . . . , s, the value C [i] generated by the division unit 44 in step S41 as a ciphertext c, a key $K_C$ as the key $K_f$ and the key $K_h$, an initial parameter N as the first Tweak value TW1, and an internal parameter ctr [i, 0] as the second Tweak value TW2, to the key generation unit 41, the hash calculation unit 42, and the decryption unit 43. Then, for each integer i of i=1, . . . , s, the plaintext generation unit 45 causes the key generation unit 41, the hash calculation unit 42, and the decryption unit 43 to execute the decryption function TD described with reference to FIG. 9, with the value C [i], the key $K_C$, the initial parameter N, and the internal parameter ctr [i, 0] as inputs. Then, the plaintext generation unit 45 handles the generated message m as the plaintext M [i].

That is, for each integer i of i=1, . . . , s, M [i]=TDp ($K_C$, (N, ctr [i, 0]), C [i]).

Not that the initial parameter N used in step S42 is a common value for each integer i of i=1, . . . , s, similarly to the initial parameter N used in step S32. Therefore, the encryption function TD illustrated in FIG. 9 is executed for each integer i of i=1, . . . , s, but generation of the key K in step S21 of FIG. 9 is required to be executed only for a certain integer i.

(Step S43: Plaintext generation process)

The plaintext generation unit 45 generates a message M in which the ciphertext C is decrypted, by concatenating a plaintext M [i] for each integer i of i=1, . . . , s.

That is, M=M [1]||M [2]||||M [s] is satisfied.

Figure 16:
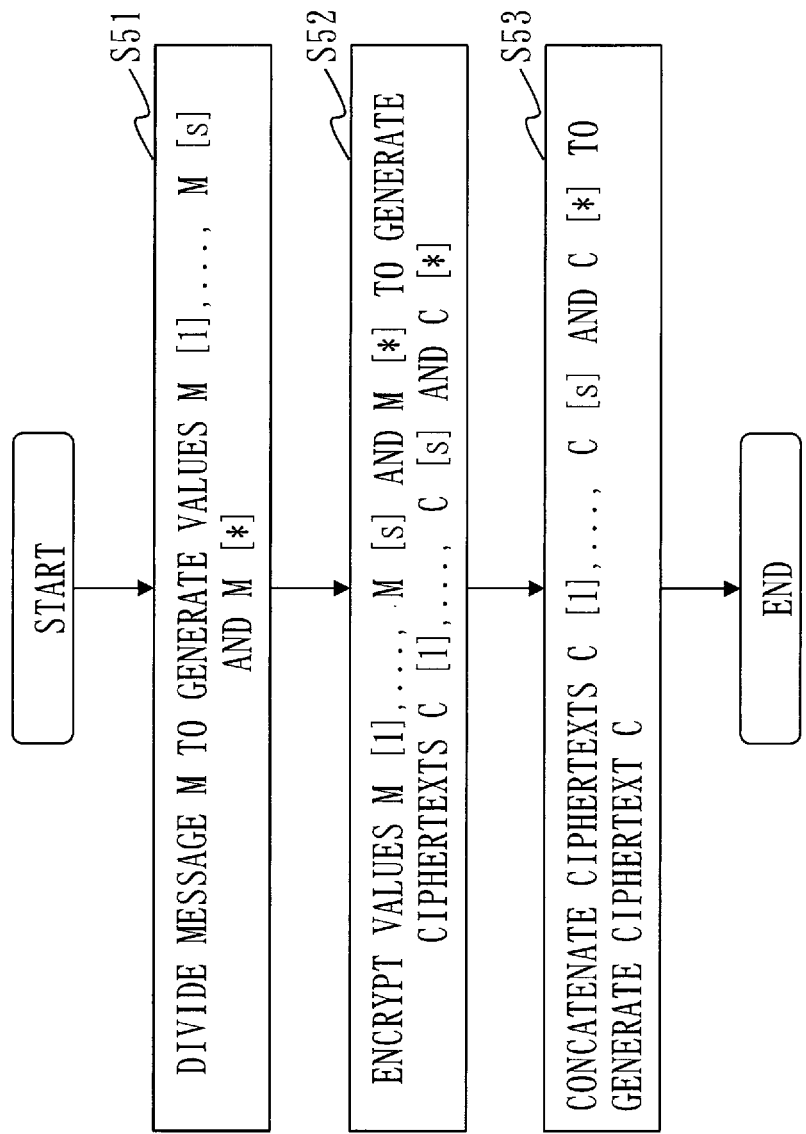
FIG. 16 is a flowchart of a second encryption algorithm according to the first embodiment.

With reference to FIG. 16, the second encryption algorithm according to the first embodiment will be described.

(Step S51: Division Process)

The division unit 24 receives an input of a message M to be encrypted. Here, it is assumed that the message M is n×s+r bits, where 0<r<n. The division unit 24 divides the message M for every n bits from the beginning, to generate a value M [1], . . . , value M [s] of n bits and a value M [*] of r bits smaller than n bits.

(Step S52: Encryption Element Generation Process)

The ciphertext generation unit 25 causes the encryption unit 23 to generate a ciphertext c as a ciphertext C [i] of a value M [i], by inputting the value M [i] generated by the division unit 24 in step S31 as a message m for each integer i of i=1, . . . , s, similarly to step S32 of FIG. 12.

Further, the ciphertext generation unit 25 causes the encryption unit 23 to generate a ciphertext c as a ciphertext R of a fixed value const, by inputting the fixed value const as the message m.

Specifically, the ciphertext generation unit 25 inputs the fixed value const as the message m, a key $K_C$ as the key $K_f$ and the key $K_h$, an initial parameter N as the first Tweak value TW1, and an internal parameter ctr [s, 1] as the second Tweak value TW2, to the key generation unit 21, the hash calculation unit 22, and the encryption unit 23. Then, the ciphertext generation unit 25 causes the key generation unit 21, the hash calculation unit 22, and the encryption unit 23 to execute the encryption function TE described with reference to FIG. 4, with the fixed value const, the key IQ, the initial parameter N, and the internal parameter ctr [s, 1] as inputs. At this time, the first encryption process is used as the encryption process in step S13 of FIG. 4. Then, the ciphertext generation unit 25 handles the generated ciphertext c as the ciphertext R.

That is, R=TEp (K, (N, ctr [s, 1]), const).

Note that, instead of the fixed value const, a value depending on a bit length of the message M and the ciphertext C may be used. As a specific example, a bit length of the message M and the ciphertext C may be used.

Further, the second encryption process may be used as the encryption process of step S13 of FIG. 4. That is, R=TEp' (K, (N, ctr [s, 1]), const) may be satisfied.

Further, for generating the ciphertext R, the key K generated at a time of generating the ciphertext C [i] may be used. Therefore, generation of the key K in step S11 of FIG. 4 need not be executed.

The ciphertext generation unit 25 calculates an exclusive OR of the first r bits of the ciphertext R and the value M [*] to generate a value C [*].

(Step S53: Ciphertext Generation Process)

The ciphertext generation unit 25 generates a ciphertext C of the message M by concatenating a ciphertext C [i] for each integer i of i=1, . . . , s and the value C [*].

That is, C=C [1]||C [2]|| . . . ||C [s]||C [*].

Figure 17:
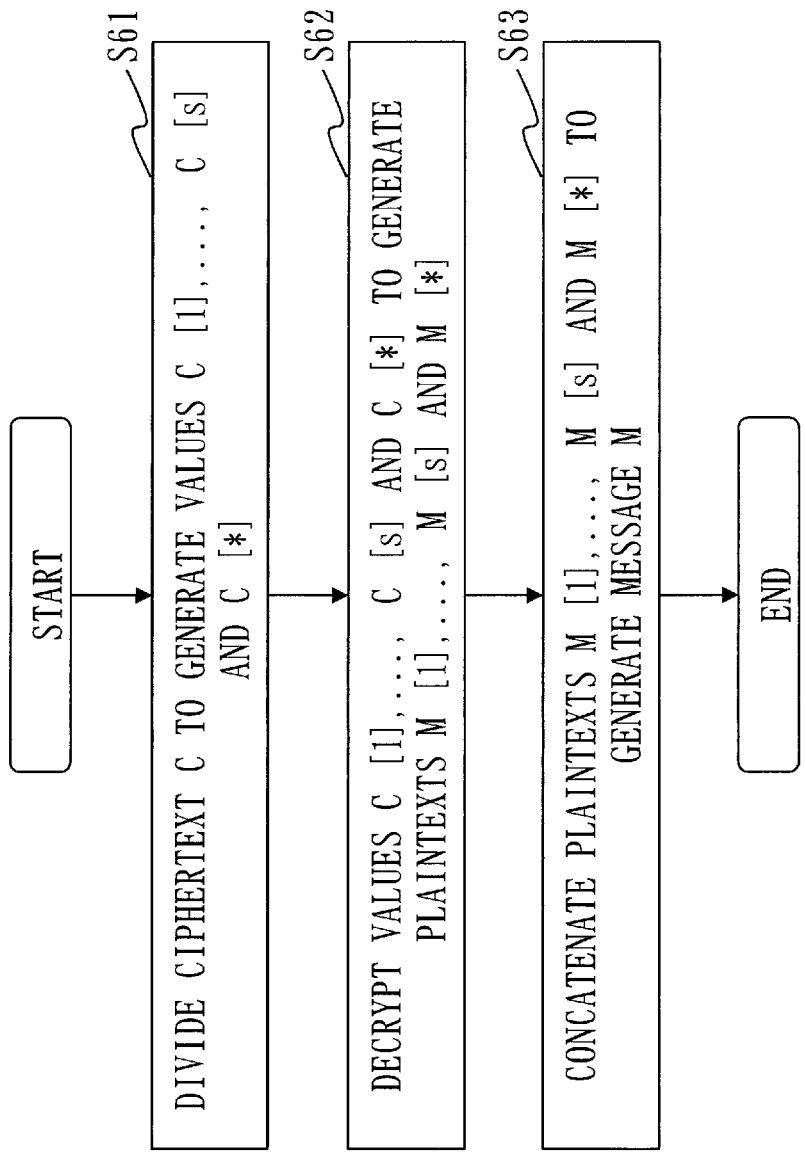
FIG. 17 is a flowchart of a second decryption algorithm according to the first embodiment.

With reference to FIG. 17, the second decryption algorithm according to the first embodiment will be described.

(Step S61: Division Process)

The division unit 44 receives an input of a ciphertext C to be decrypted. Here, it is assumed that the ciphertext C is n×s+r bits, where 0<r<n. The division unit 44 divides the ciphertext C for every n bits from the beginning, to generate a value C [1], . . . , value C [s] of n bits and a value C [*] of r bits smaller than n bits.

(Step S62: Plaintext Element Generation Process)

The plaintext generation unit 45 causes the decryption unit 43 to generate a message m as the message M [i] in which a value C [i] is decrypted, by inputting the value C [i] generated by the division unit 44 in step S41 as a ciphertext c for each integer i of i=1, s, similarly to in step S42 of FIG. 14.

Further, the plaintext generation unit 45 causes the encryption unit 23 to generate a ciphertext c as a ciphertext R of a fixed value const, by inputting the fixed value const as the message m, similarly to step S52 of FIG. 16.

Note that, in a case where a value depending on a bit length of the message M and the ciphertext C is used instead of the fixed value const in step S52, the plaintext generation unit 45 uses the same value as in step S52.

The plaintext generation unit 45 calculates an exclusive OR of the first r bits of the ciphertext R and the value C [*] to generate a value M [*].

(Step S63: Plaintext Generation Process)

The plaintext generation unit 45 generates a message M in which the ciphertext C is decrypted, by concatenating a plaintext M [i] for each integer i of i=1, . . . , s and the value M [*].

That is, M=M [1]||M [2]||M [s]||[*].

Figure 18:
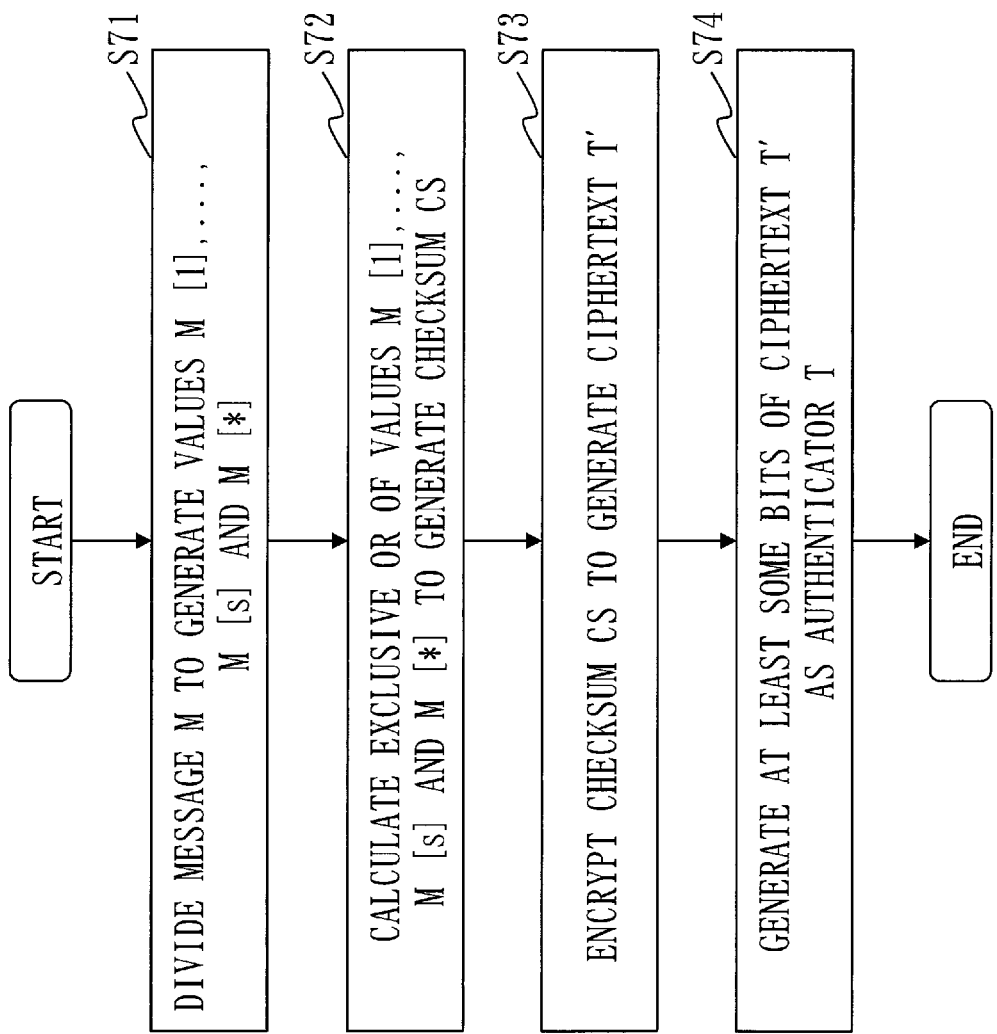
FIG. 18 is a flowchart of an authenticator generation algorithm according to the first embodiment.
Figure 19:
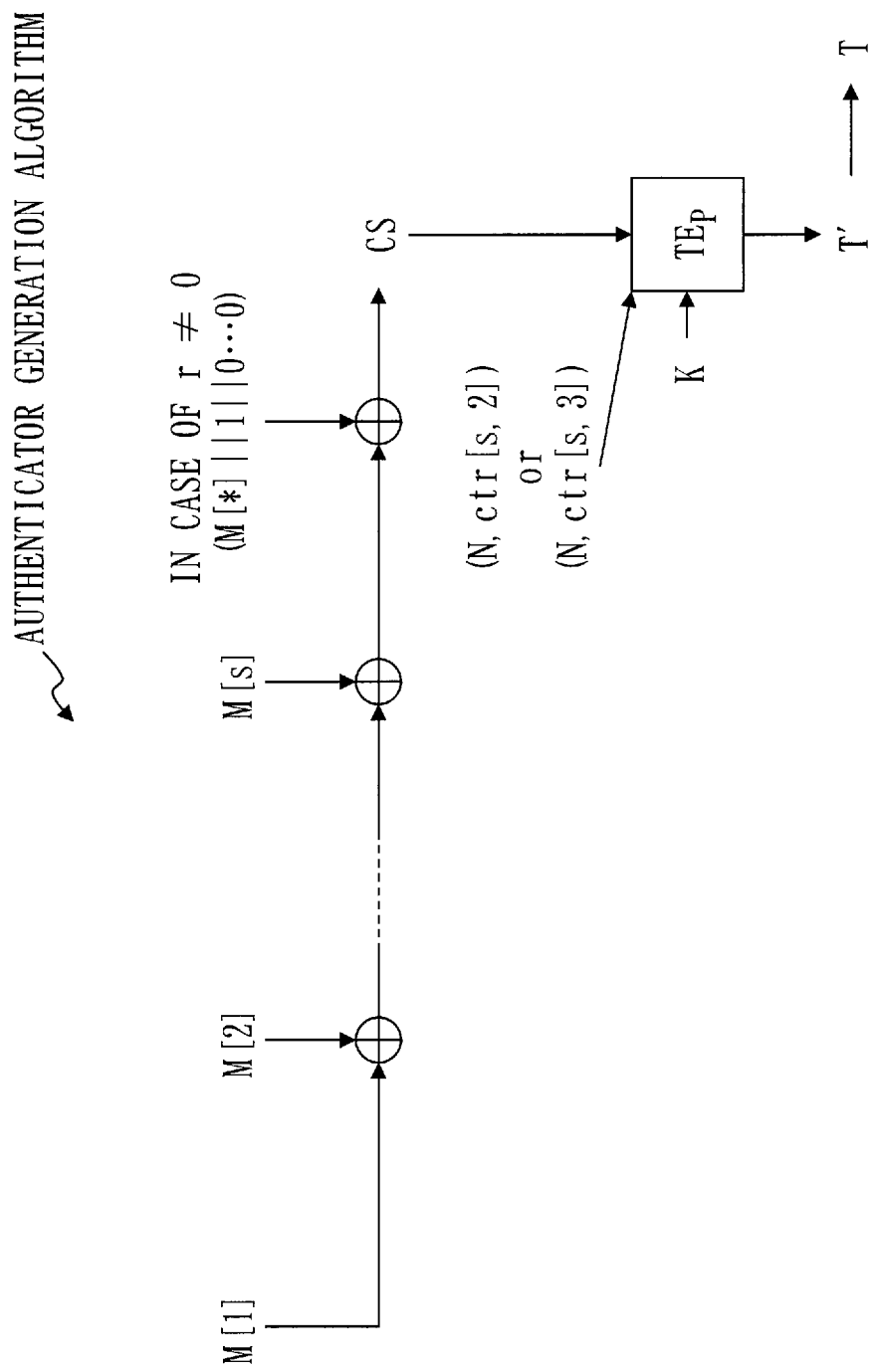
FIG. 19 is an explanatory diagram of the authenticator generation algorithm according to the first embodiment.

With reference to FIGS. 18 and 19, the authenticator generation algorithm according to the first embodiment will be described.

The authenticator generation algorithm is used both when the message M is a multiple of n bits and when the message M is not a multiple of n bits. Here, it is assumed that the message M is n×s+r bits, where 0<r<n.

(Step S71: Division Process)

The division unit 24 divides the message M for every n bits from the beginning, to generate a value M [1], . . . , value M [s] of n bits and a value M [*] of r bits. However, in a case of r=0, the value M [*] is an empty string.

(Step S72: Checksum Generation Process)

(1) In a case of r=0, the authenticator generation unit 26 generates a checksum CS by calculating an exclusive OR of the value M [i] for each integer i of i=1, . . . , s generated by the division unit 24 in step S71.

That is, Formula 4 is satisfied.

$$CS = M[1] \oplus M[2] \oplus \ldots \oplus M[s] \quad \text{[Formula 4]}$$

(2) In a case of r≠0, the authenticator generation unit 26 generates a value M [*]' of n bits by adding some bit string such as a bit string in which a bit string of 0 is added after 1, after the value M [*] generated by the division unit 24 in step S71. The authenticator generation unit 26 generates the checksum CS by calculating an exclusive OR of the value M [i] for each integer i of i=1, . . . , s and the value M [*]'.

This is expressed in Formula 5.

$$CS = M[1] \oplus M[2] \oplus \ldots \oplus M[s] \oplus M[*]' \quad \text{[Formula 5]}$$

(Step S73: Authentication Element Generation Process)

The authenticator generation unit 26 cause the encryption unit 23 to generate a ciphertext c as a ciphertext T' of the checksum CS by inputting the checksum CS generated in step S72, as a message m.

Specifically, the authenticator generation unit 26 inputs the checksum CS as the message m, a key $K_C$ as the key $K_f$ and the key $K_h$, an initial parameter N as the first Tweak value TW1, and an internal parameter ctr [i, 0] as the second Tweak value TW2, to the key generation unit 21, the hash calculation unit 22, and the encryption unit 23. Then, the authenticator generation unit 26 causes the key generation unit 21, the hash calculation unit 22, and the encryption unit 23 to execute the encryption function TE described with reference to FIG. 4, with the checksum CS, the key $K_C$, the initial parameter N, and the internal parameter ctr as inputs. At this time, the first encryption process is used as the encryption process in step S13 of FIG. 4. Then, the ciphertext generation unit 25 handles the generated ciphertext c as the ciphertext T'.

Note that, (1) in a case of r=0, an internal parameter ctr [s, 2] is used as the internal parameter ctr. (2) In a case of r≠0, an internal parameter ctr [s, 3] different from the internal parameter ctr [s, 2] is used as the internal parameter ctr.

This is expressed in Formula 6.

(1) In case of r=0

$$T' = TEp(K,(N,ctr[s,2]),\text{Checksum})$$

(2) In case of r=0

$$T' = TEp'(K,(N,ctr[s,3]),\text{Checksum}) \quad \text{[Formula 6]}$$

Meanwhile, the second encryption process may be used as the encryption process of step S13 of FIG. 4. That is, Formula 7 is satisfied.

(1) In case of r=0

$$T' = TEp'(K,(N,ctr[s,2]),\text{Checksum})$$

(2) In case of r≠0

$$T' = TEp'(K,(N,ctr[s,3]),\text{Checksum}) \quad \text{[Formula 7]}$$

(Step S74: Authenticator Generation Process)

The authenticator generation unit 26 extracts bits of a fixed length in the ciphertext T' generated in step S73, as the authenticator T.

Figure 20:
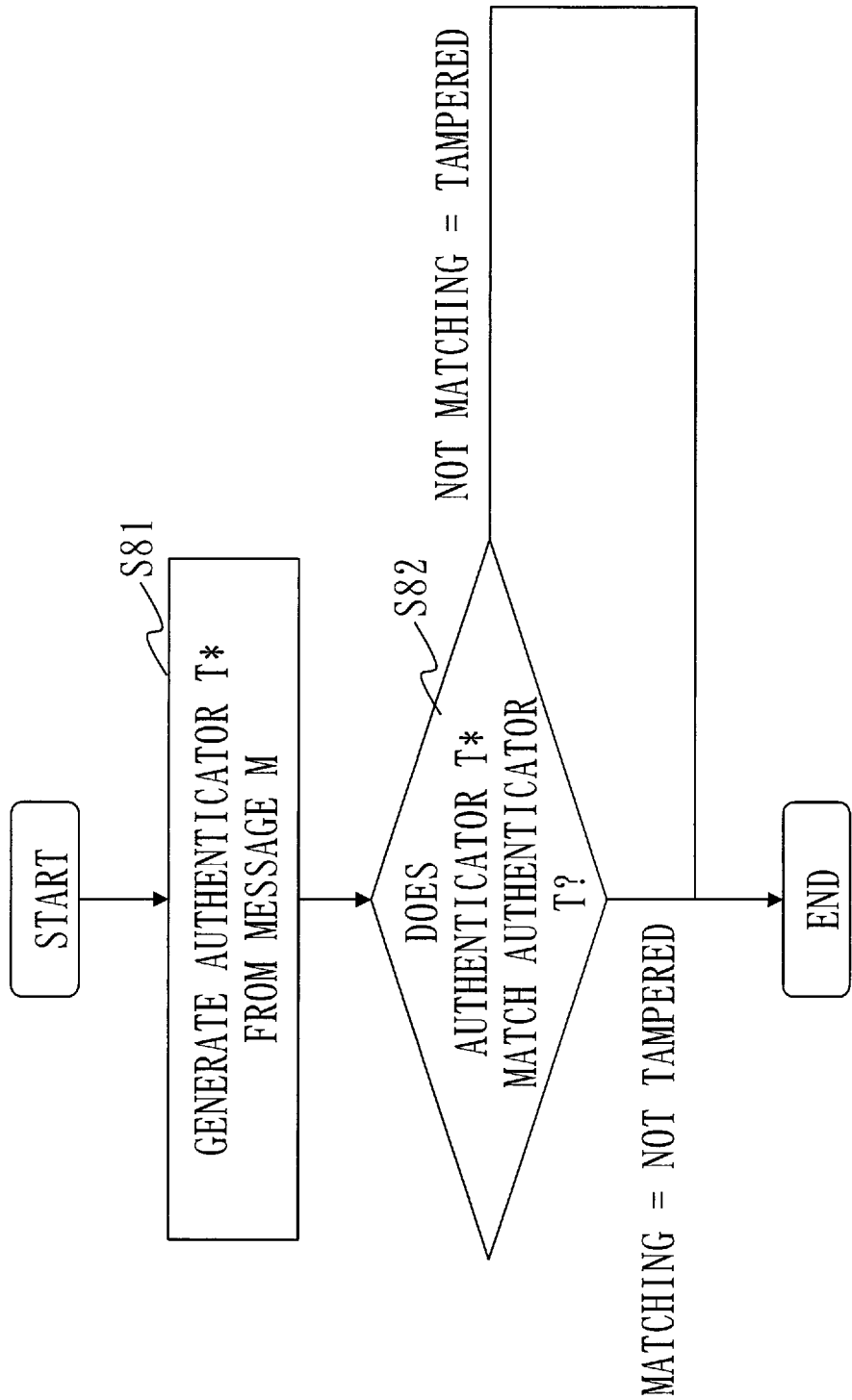
FIG. 20 is a flowchart of a verification algorithm according to the first embodiment.

With reference to FIG. 20, the verification algorithm according to the first embodiment will be described.

(Step S81: Authenticator Generation Process)

The verification unit 46 acquires a message M generated by the first decryption algorithm or the second decryption algorithm. The verification unit 46 generates an authenticator T as an authenticator T* from the message M, by a method similar to that of the authenticator generation algorithm.

(Step S82: Verification Process)

The verification unit 46 determines whether or not the authenticator T* generated in step S81 matches the authenticator T obtained along with the ciphertext C.

When the authenticator T* and the authenticator T match, the verification unit 46 determines that the message M has not been tampered with. Whereas, when the authenticator T* and the authenticator T do not match, the verification unit 46 determines that the message M has been tampered with.

\*\*\*Effect of First Embodiment\*\*\*

As described above, in the encryption system 1 according to the first embodiment, the authentication encryption algorithm is realized by using the encryption function TE described with reference to FIG. 4 and the decryption function TD described with reference to FIG. 9.

In the encryption function TE and the decryption function TD, the key K is calculated in accordance with the initial parameter N. That is, the key K changes in accordance with the initial parameter N. Therefore, it becomes difficult to estimate the key K, and the upper bound value c can be made smaller than the birthday bound, while the number of operations of the block cipher called in the Tweakable block cipher operation is set to one.

Specifically, assuming that the total number of calls of the block cipher is σ, and the number of times of the tweakable block cipher called within one operation of the authentication encryption algorithm is L, the authentication encryption algorithm realized by the encryption system 1 according to the first embodiment satisfies $\varepsilon = O(L\sigma/2^n)$. Since L<σ is satisfied, this probability is smaller value than the birthday bound. This makes it possible to reduce the frequency of key update.

Further, in the encryption system 1 according to the first embodiment, the input to the hash function h need not include the initial parameter N. In this case, the input to the hash function h is only the internal parameter ctr and the key Kh. The internal parameter ctr is a counter value, and a value to be used can be specified in advance. Further, the key $K_h$ is shared in advance with the other party.

Therefore, the processing of step S12 of FIG. 4 and step S22 of FIG. 9 can be executed in advance. That is, rather than performing the processing of step S12 of FIG. 4 or step S22 of FIG. 9 with the authentication encryption algorithm to calculate a hash value msk after the encryption function TE or the decryption function TD is called, it is possible to calculate the hash value msk in advance.

On the other hand, in the conventional tweakable block cipher, the initial parameter N is included in the input to the hash function h. As the initial parameter N, a different value is used for each encryption. Therefore, the hash function h cannot be calculated unless performing encryption and determining the value of the initial parameter N.

Accordingly, in the encryption system 1 according to the first embodiment, the processing of the authentication encryption algorithm can be speeded up. Further, hardware and software necessary to calculate the hash function h can be omitted.

\*\*\*Other Configuration\*\*\*

<Modification 1>

In the first embodiment, the tweakable block cipher described with reference to FIGS. 4 to 11 is applied to the authentication encryption algorithm described with reference to FIGS. 12 to 20. However, it is also possible to apply the tweakable block cipher described with reference to FIGS. 4 to 11 to the authentication encryption algorithms of other configurations. Also in this case, the above-described effects may be obtained.

For example, it is possible to apply the tweakable block cipher described with reference to FIGS. 4 to 11 to the authentication encryption algorithm configured as described in Patent Literature 5. In this case, the tweakable block cipher described with reference to FIGS. 4 to 11 may be used as a function F_K of the authentication encryption algorithm having the configuration described in Patent Literature 5.

<Modification 2>

In the above description, the encryption device 10 and the decryption device 30 are provided with the processing circuits 11 and 31 that are dedicated electronic circuits for realizing individual functions. Here, individual functions of the encryption device 10 are functions of the key generation unit 21, the hash calculation unit 22, the encryption unit 23, the division unit 24, the ciphertext generation unit 25, the authenticator generation unit 26, the first replacement unit 27, the block cipher calculation unit 28, and the second replacement unit 29. Further, individual functions of the decryption device 30 are functions of the first replacement unit 47, the block cipher calculation unit 48, and the second replacement unit 49. However, individual functions may be realized by software.

Figure 21:
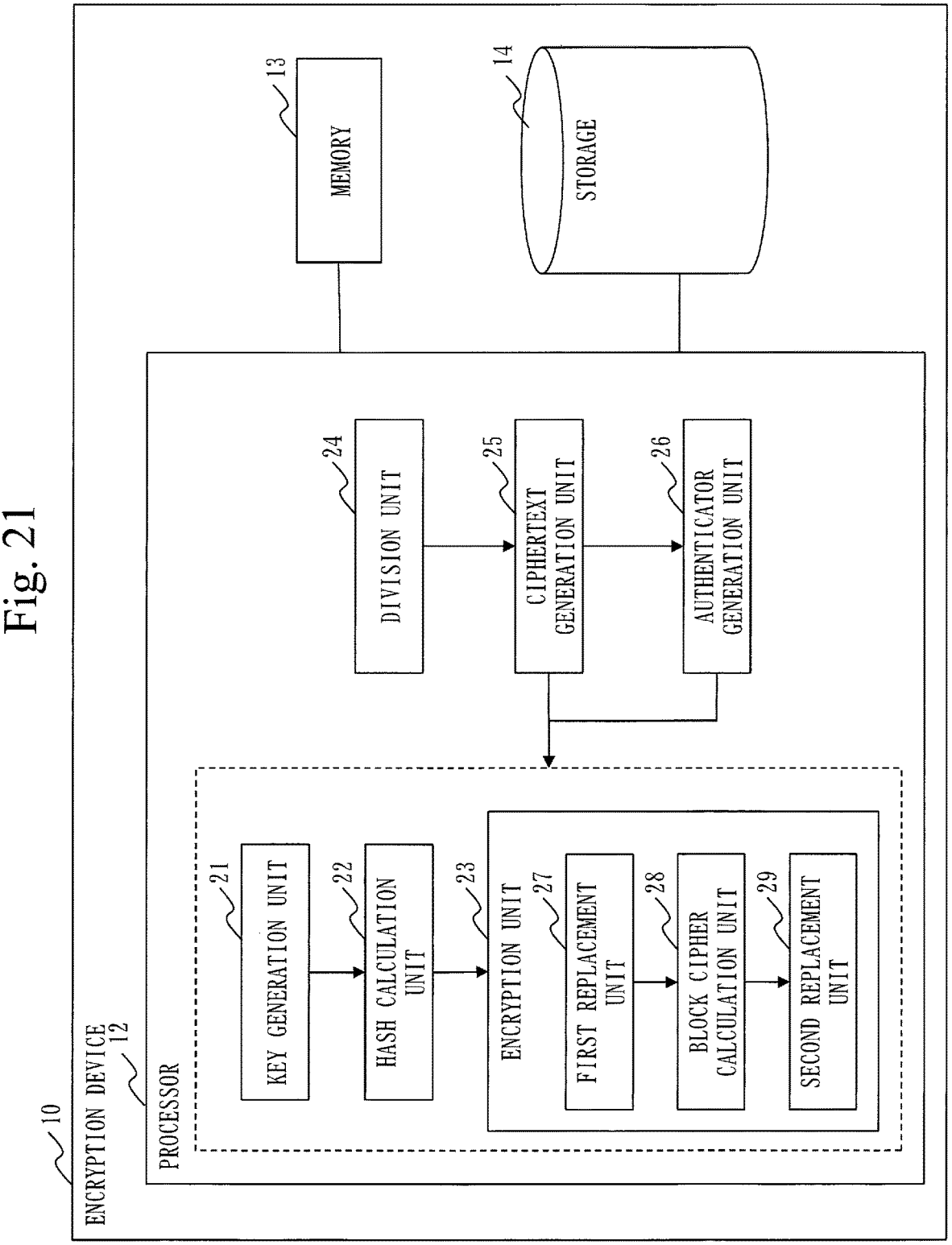
FIG. 21 is a configuration diagram of an encryption device 10 according to Modification 2.

FIG. 21 is a configuration diagram of an encryption device 10 according to Modification 2.

The encryption device 10 is a computer.

The encryption device 10 includes hardware of a processor 12, a memory 13, and a storage 14. The processor 12 is connected to another hardware via a signal line, and controls the another hardware.

The storage 14 stores a program for realizing each functional component of the encryption device 10. This program is read into the memory 13 by the processor 12 and executed by the processor 12. This enables realization of a function of each functional component of the encryption device 10.

Figure 22:
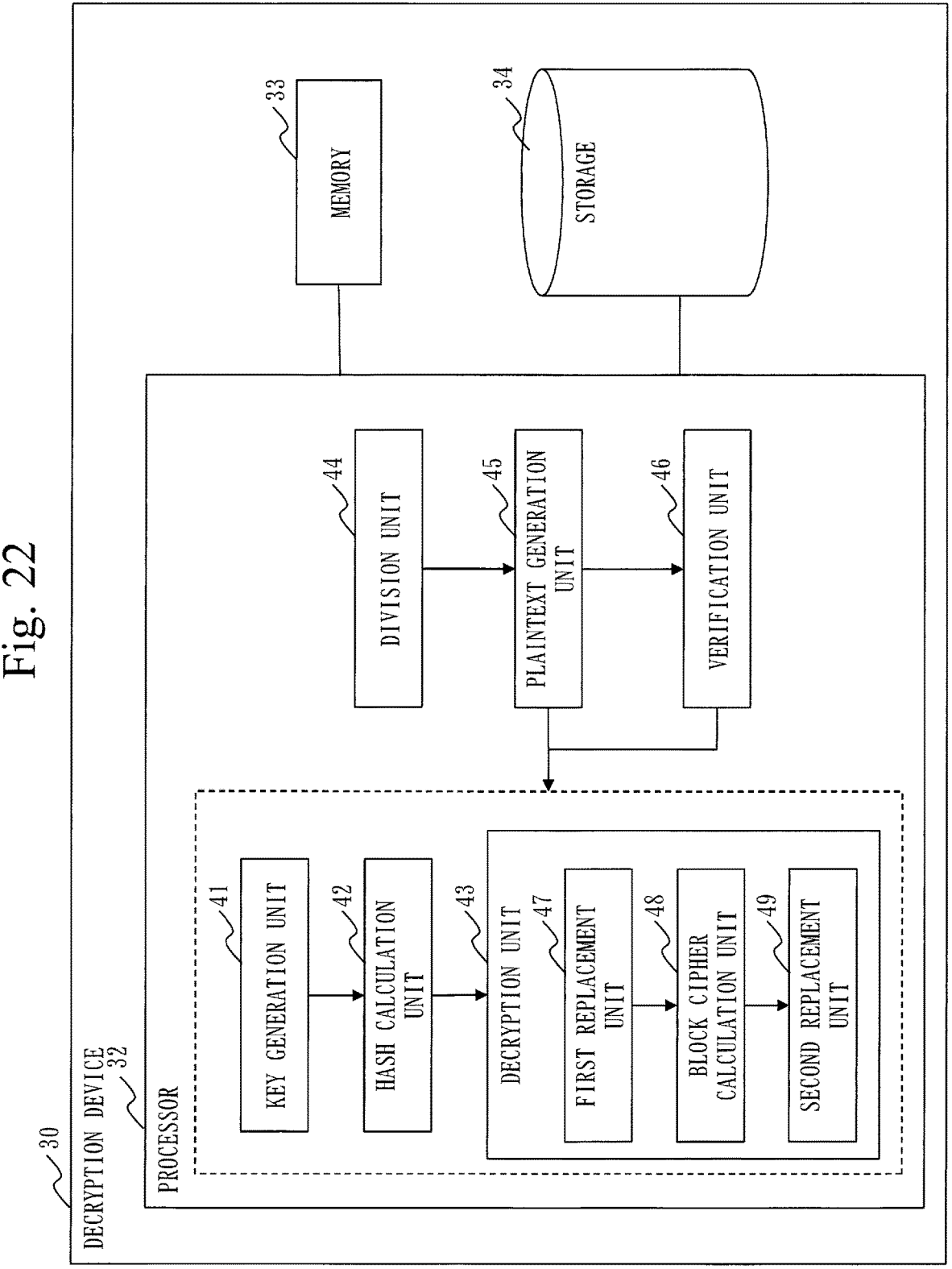
FIG. 22 is a configuration diagram of a decryption device 30 according to Modification 2.

FIG. 22 is a configuration diagram of a decryption device 30 according to Modification 2.

The decryption device 30 is a computer.

The decryption device 30 includes hardware of a processor 32, a memory 33, and a storage 34. The processor 32 is connected to another hardware via a signal line, and controls the another hardware.

The storage 34 stores a program for realizing each functional component of the decryption device 30. This program is read into the memory 33 by the processor 32 and executed by the processor 32. This enables realization of a function of each functional component of the decryption device 30.

The processors 12 and 32 are integrated circuits (ICs) that perform processing. Specifically, the processors 12 and 32 are central processing units (CPUs), digital signal processors (DSPs), or graphics processing units (GPUs).

The memories 13 and 33 are storage devices that temporarily store data. As a specific example, the memories 13 and 33 are static random access memories (SRAMs) or dynamic random access memories (DRAMs).

The storages 14 and 34 are storage devices that store data. As a specific example, the storages 14 and 34 are hard disk drives (HDDs). In addition, the storage 14, 34 may be a portable storage medium such as a secure digital (SD, registered trademark) memory card, a compact flash (CF), a NAND flash, a flexible disk, an optical disk, a compact disk, a Blu-Ray (registered trademark) disk, or a digital versatile disk (DVD).

Information, data, signal values, and variable values indicating a result of processing of each function realized by the processors 12 and 32 are stored in the memories 13 and 33, the storages 14 and 34, or a storage area such as a register or a cache memory in the processor 12.

In FIG. 21, only one processor 12 is illustrated. However, the encryption device 10 may include a plurality of processors, and the plurality of processors may cooperatively execute a program for realizing each function. Similarly, in FIG. 22, only one processor 32 is illustrated. However, the decryption device 30 may include a plurality of processors, and the plurality of processors may cooperatively execute a program for realizing each function.

<Modification 3>

Some function may be realized by hardware, and other function may be realized by software. Further, each function may be realized by firmware. That is, in a functional component of the encryption device 10, some function may be realized by hardware, and other function may be realized by software. Further, in a functional component of the decryption device 30, some function may be realized by hardware, and other function may be realized by software.

The processing circuits 11 and 31, the processors 12 and 32, the memories 13 and 33, the storages 14 and 34 are collectively referred to as "processing circuitry". That is, a function of each functional component is realized by the processing circuitry.

Second Embodiment

A second embodiment differs from the first embodiment in that public data H is given as an input to an encryption device 10 and a decryption device 30. In the second embodiment, this difference will be described, and a description of same points will be omitted.

*Description of Operation*

With reference to FIGS. 23 to 28, an operation of an encryption system 1 according to the second embodiment will be described.

An operation of the encryption device 10 according to the second embodiment corresponds to an encryption method according to the second embodiment. Further, the operation of the encryption device 10 according to the second embodiment corresponds to processing of an encryption program according to the second embodiment.

An operation of the decryption device 30 according to the second embodiment corresponds to a decryption method according to the second embodiment. Further, the operation of the decryption device 30 according to the second embodiment corresponds to processing of a decryption program according to the second embodiment.

The public data H is data to be transmitted from the encryption device 10 to the decryption device 30 together with a ciphertext C and an authenticator T. The public data H is data that is not encrypted but is verified as to whether or not it has been tampered with. Therefore, the encryption device 10 generates the authenticator T capable of verifying the presence or absence of tampering of a message M and the public data H.

As described in the first embodiment, the decryption device 30 generates an authenticator T* by a method similar to that of the encryption device 10, to verify the authenticator T. This allows specification as to whether the message M and the public data H have not been tampered with, or at least one of the message M or the public data H has been tampered with.

In the second embodiment, three generation methods of the authenticator T will be described. By using any of the three generation methods, it is possible to generate the authenticator T capable of verifying the presence or absence of tampering of the message M and the public data H.

Figure 23:
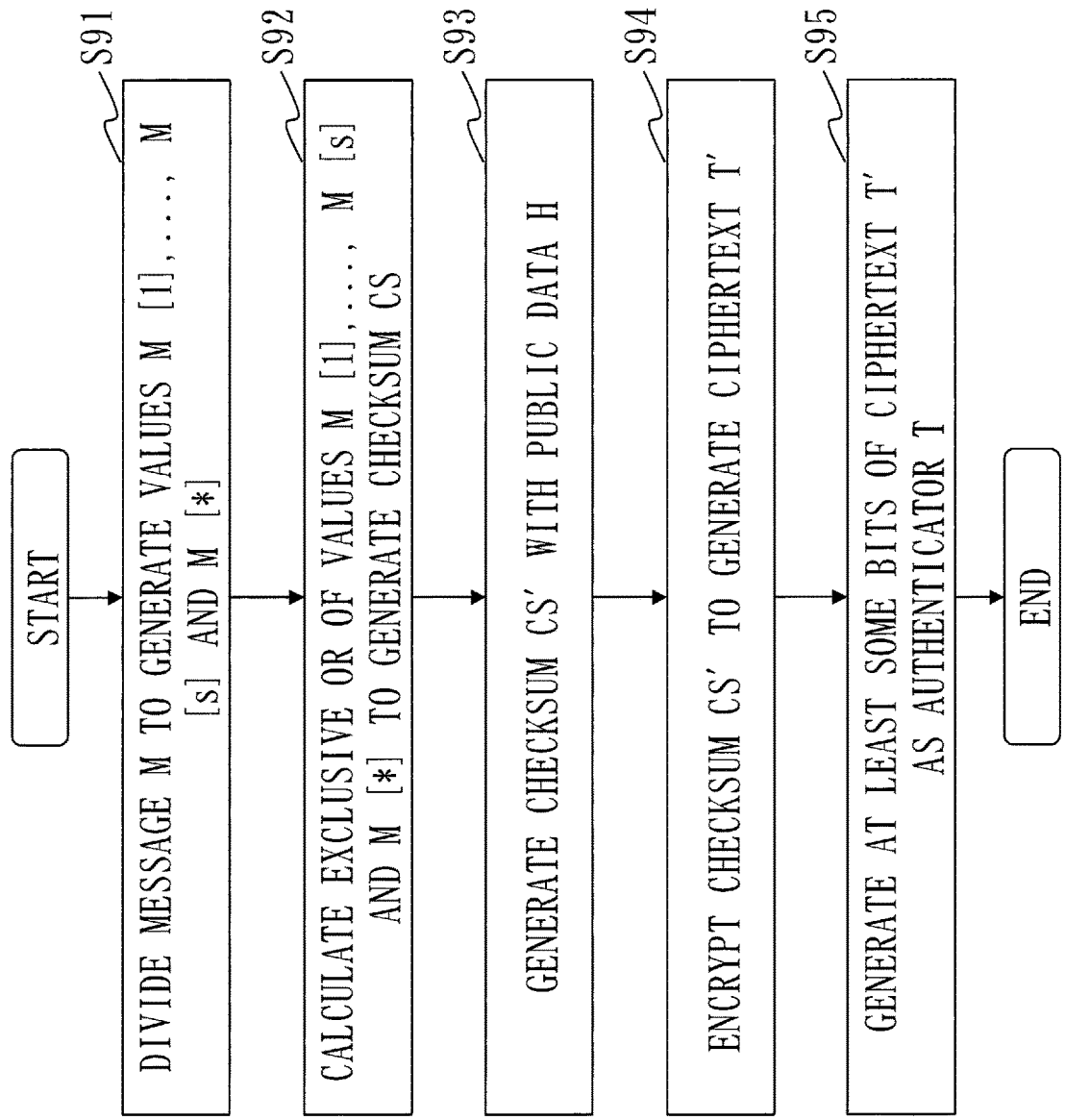
FIG. 23 is a flowchart of a generation method 1 of an authenticator T according to a second embodiment.
Figure 24:
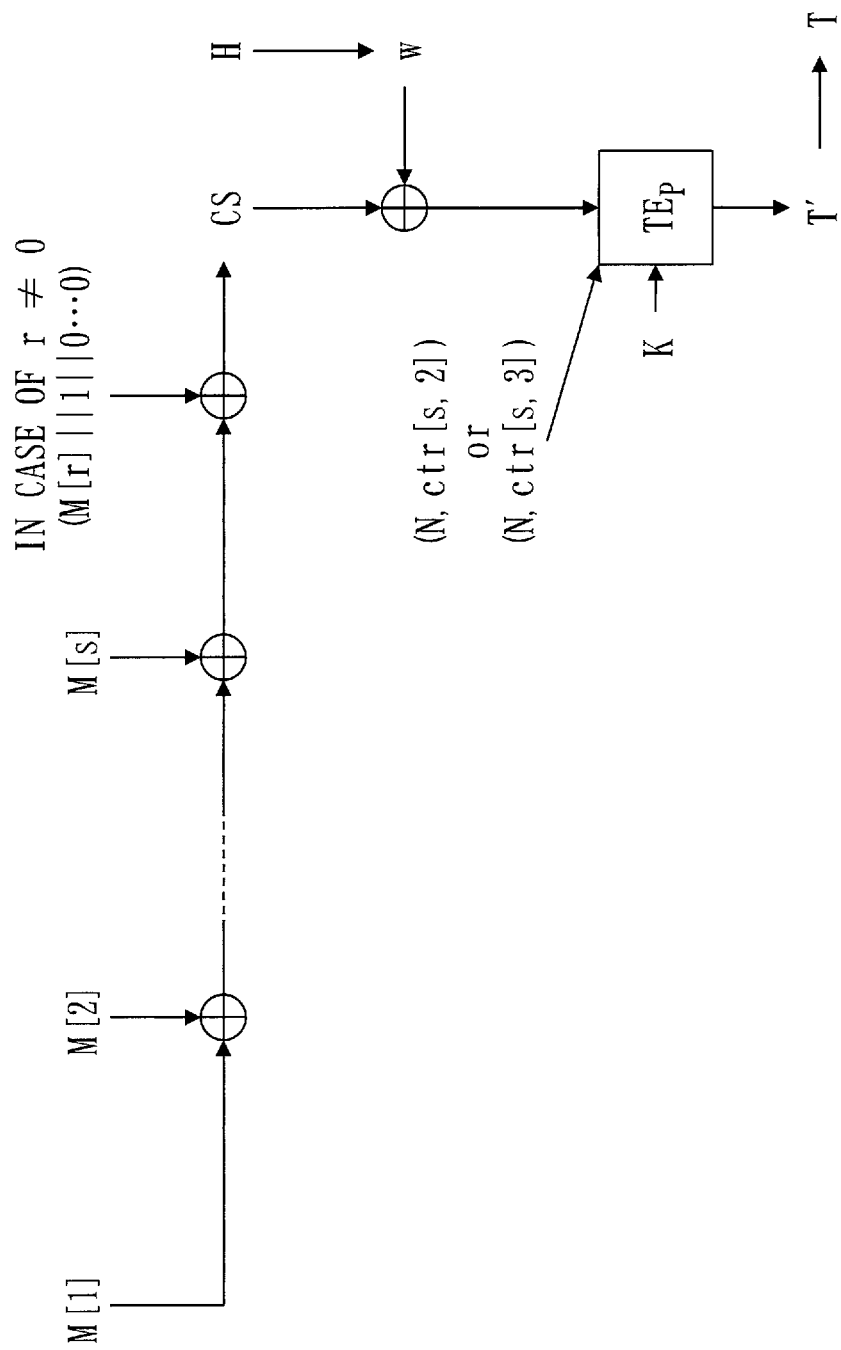
FIG. 24 is explanatory diagram of the generation method 1 of the authenticator T according to the second embodiment.

With reference to FIGS. 23 and 24, a generation method 1 of the authenticator T according to the second embodiment will be described.

Processing of steps S91 to S92 is the same as processing of steps S71 to S72 of FIG. 18. Further, processing of step S95 is the same as processing of step S74 of FIG. 18.

(Step S93: Public Data Generation Process)

The authenticator generation unit 26 generates a value w of n bits by a pseudo random function, with the public data H as an input.

The authenticator generation unit 26 generates a new checksum CS' by calculating an exclusive OR of a checksum CS generated in step S92 and the value w. Alternatively, the authenticator generation unit 26 generates the new checksum CS' by adding the value w to the checksum CS generated in step S92.

(Step S94: Authentication Element Generation Process)

The authenticator generation unit 26 causes the encryption unit 23 to generate a ciphertext c as a ciphertext T' of the checksum CS', by inputting the new checksum CS' generated in step S93, as a message m.

Figure 25:
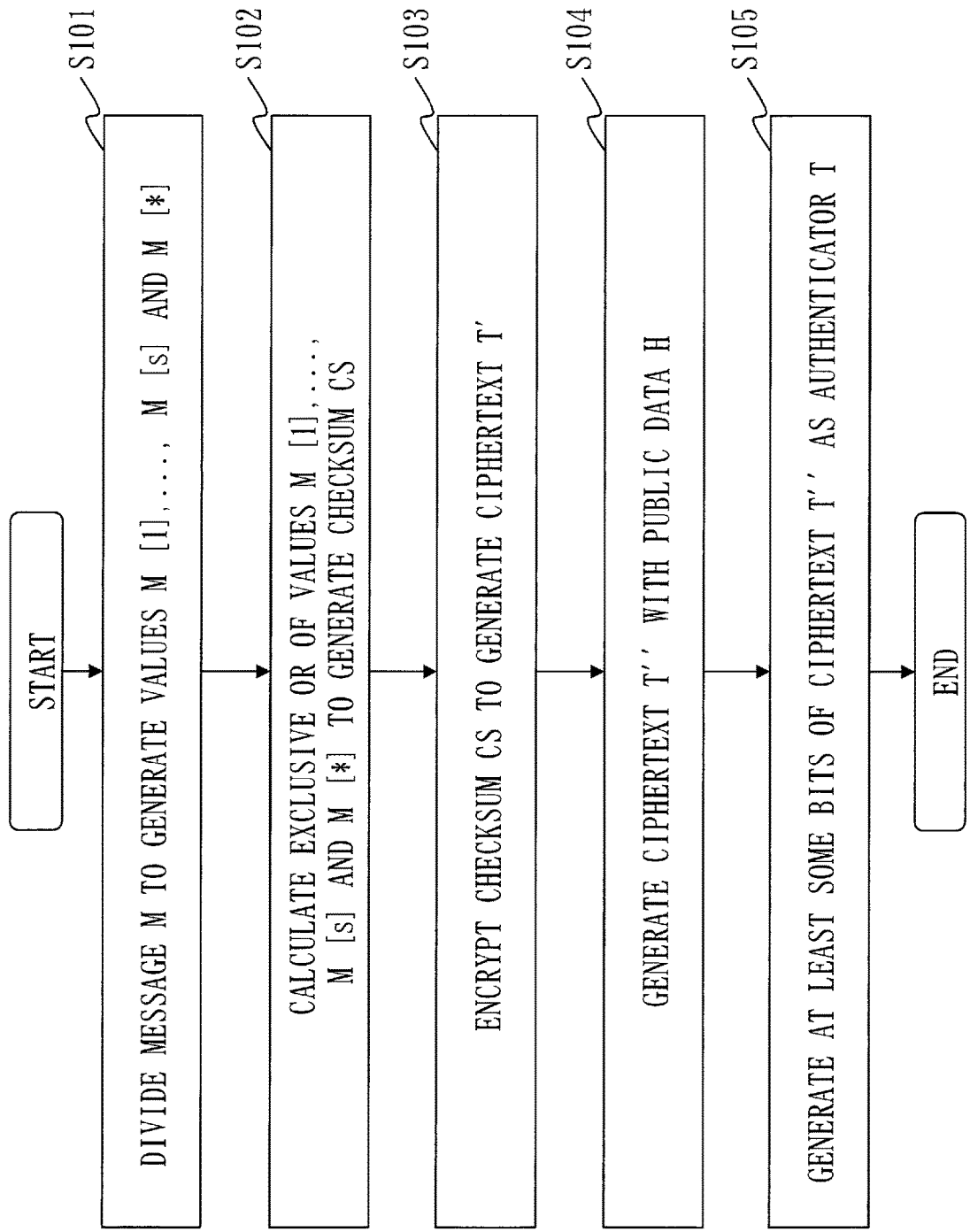
FIG. 25 is a flowchart of a generation method 2 of the authenticator T according to the second embodiment.
Figure 26:
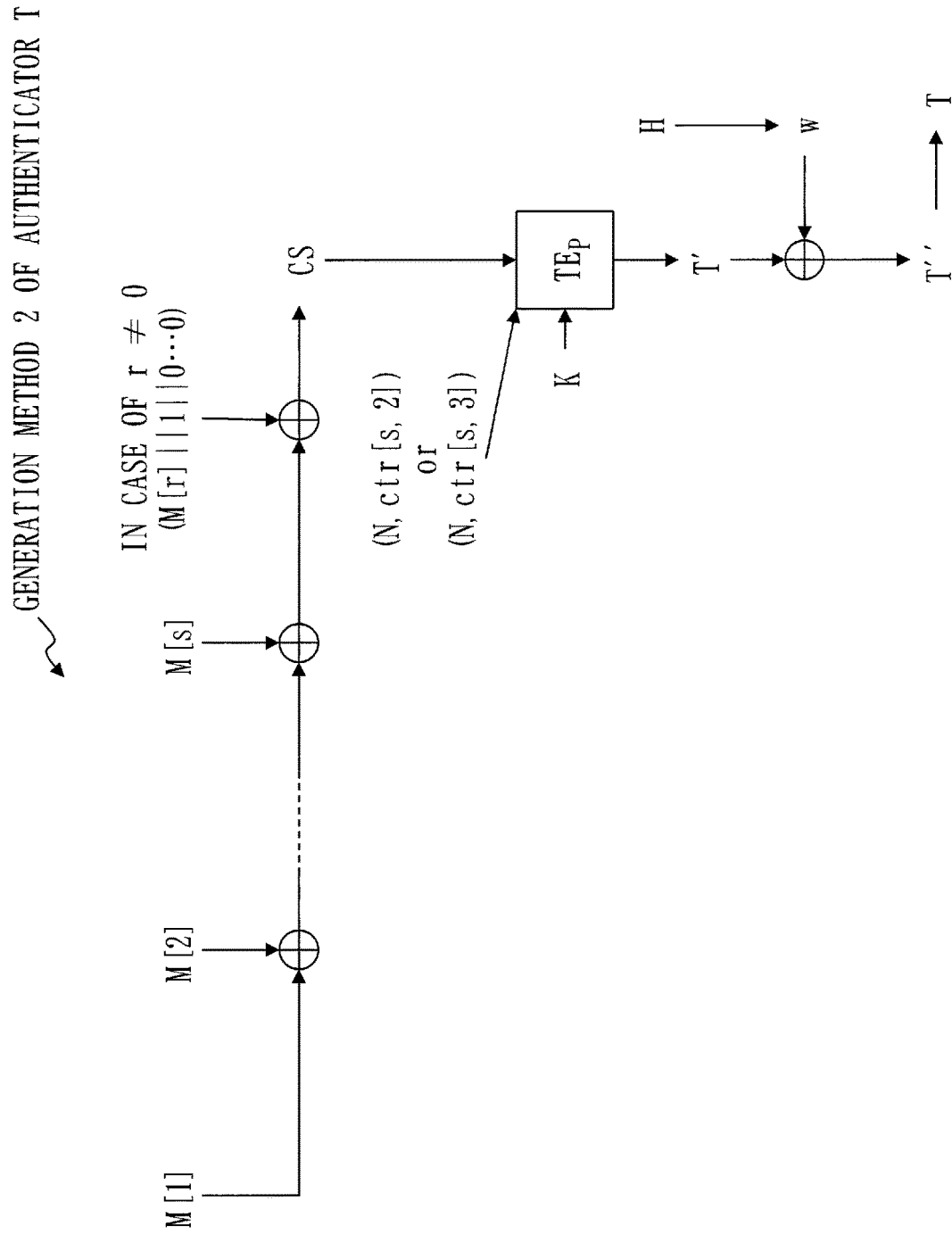
FIG. 26 is explanatory diagram of the generation method 2 of the authenticator T according to the second embodiment.

With reference to FIGS. 25 and 26, a generation method2 of the authenticator T according to the second embodiment will be described.

Processing of steps S101 to S103 is the same as processing of steps S71 to S73 of FIG. 18.

(Step S104: Public Data Generation Process)

The authenticator generation unit 26 generates a value w of n bits by a pseudo random function, with the public data H as an input.

The authenticator generation unit 26 generates a new ciphertext T" by calculating an exclusive OR of a ciphertext T generated in step S103 and the value w. Alternatively, the authenticator generation unit 26 generates the new ciphertext T" by adding the value w to the ciphertext T' generated in step S103.

(Step S105: Authenticator Generation Process)

The authenticator generation unit 26 extracts bits of a fixed length in the new ciphertext T" generated in step S104, as the authenticator T.

With reference to FIGS. 27 and 28 and FIGS. 4 and 9, a generation method 3 of the authenticator T according to the second embodiment will be described.

In the generation method 3 of the authenticator T, a change is made in configurations of the encryption function TE and the decryption function TD of the tweakable block cipher system.

Figure 27:
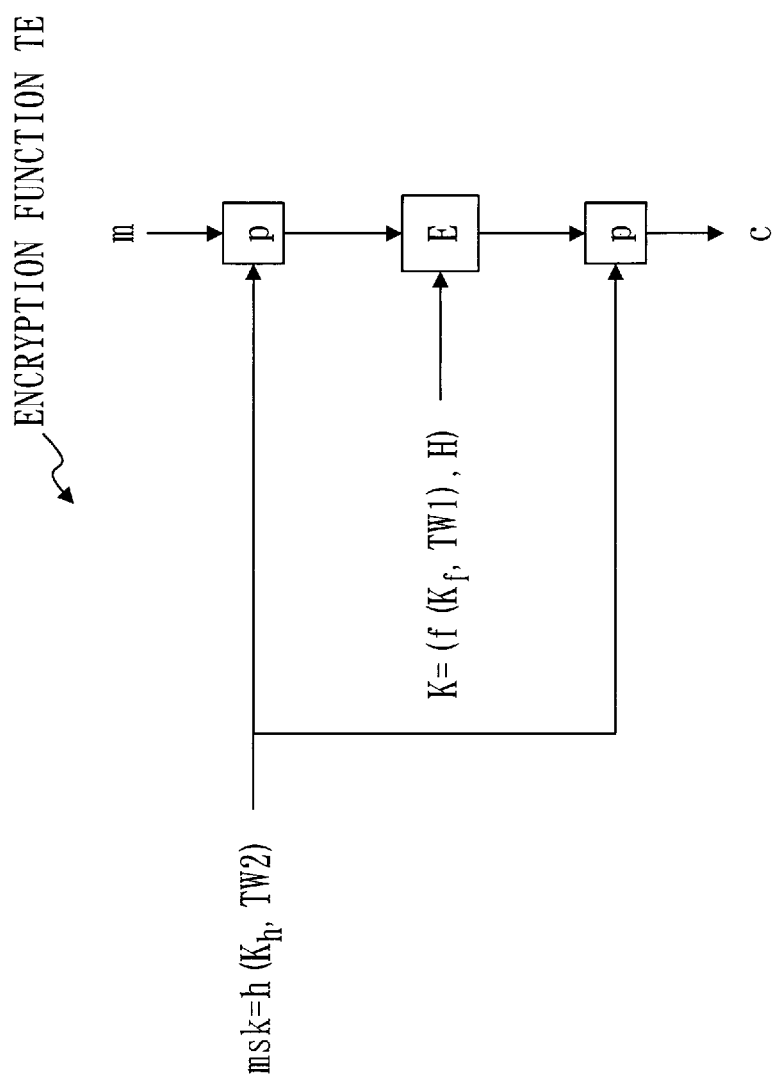
FIG. 27 is explanatory diagram of a generation method 3 of the authenticator T according to the second embodiment.
Figure 28:
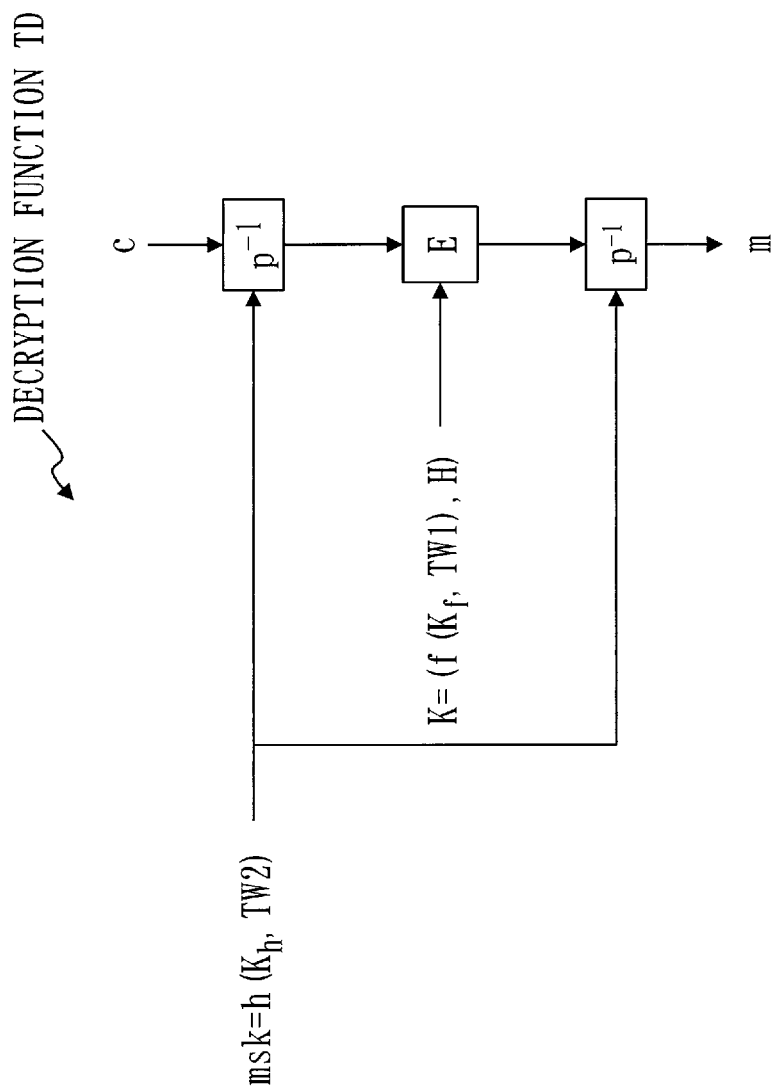
FIG. 28 is explanatory diagram of the generation method 3 of the authenticator T according to the second embodiment.

Specifically, in step S11 of FIG. 4, the key generation unit 21 generates a key K in accordance with a first Tweak value TW1 and the public data H, as illustrated in FIG. 27. Similarly, in step S21 of FIG. 9, the key generation unit 41 generates a key K in accordance with a first Tweak value TW1 and the public data H, as illustrated in FIG. 28.

As a specific example, the key generation unit 21 and the key generation unit 41 generate a temporary key K' of k bits by a keyed function f, with a key $K_f$ and the first Tweak value TW1 as inputs. The key generation unit 21 and the key generation unit 41 calculate an exclusive OR of the temporary key K' and the value w calculated from the public data H, to generate the key K.

Note that the authenticator generation unit 26 generates the value w of n bits in advance by a pseudo random function, with the public data H as an input. "In advance" means before using the encryption function TE in the first encryption algorithm, the second encryption algorithm, and the authenticator generation algorithm. Similarly, the verification unit 46 generates the value w of n bits in advance by a pseudo random function, with the public data H as an input. "In advance" means before using the decryption function TD in the first decryption algorithm, the second decryption algorithm, and the verification algorithm.

*Effect of Second Embodiment*

As described above, in the encryption system 1 according to the second embodiment, when there is the public data H, the authenticator T can be generated so as to enable detection of tampering of the public data H.

*Other Configuration*

<Modification 4>

In the second embodiment, the authenticator generation unit 26 and the verification unit 46 generate the value w of n bits by the pseudo random function, with the public data H as an input. The value w may be generated from the public data H as follows. Here, processing for the authenticator generation unit 26 to generate the value w will be described, but the processing for the verification unit 46 to generate the value w is also similar.

Figure 29:
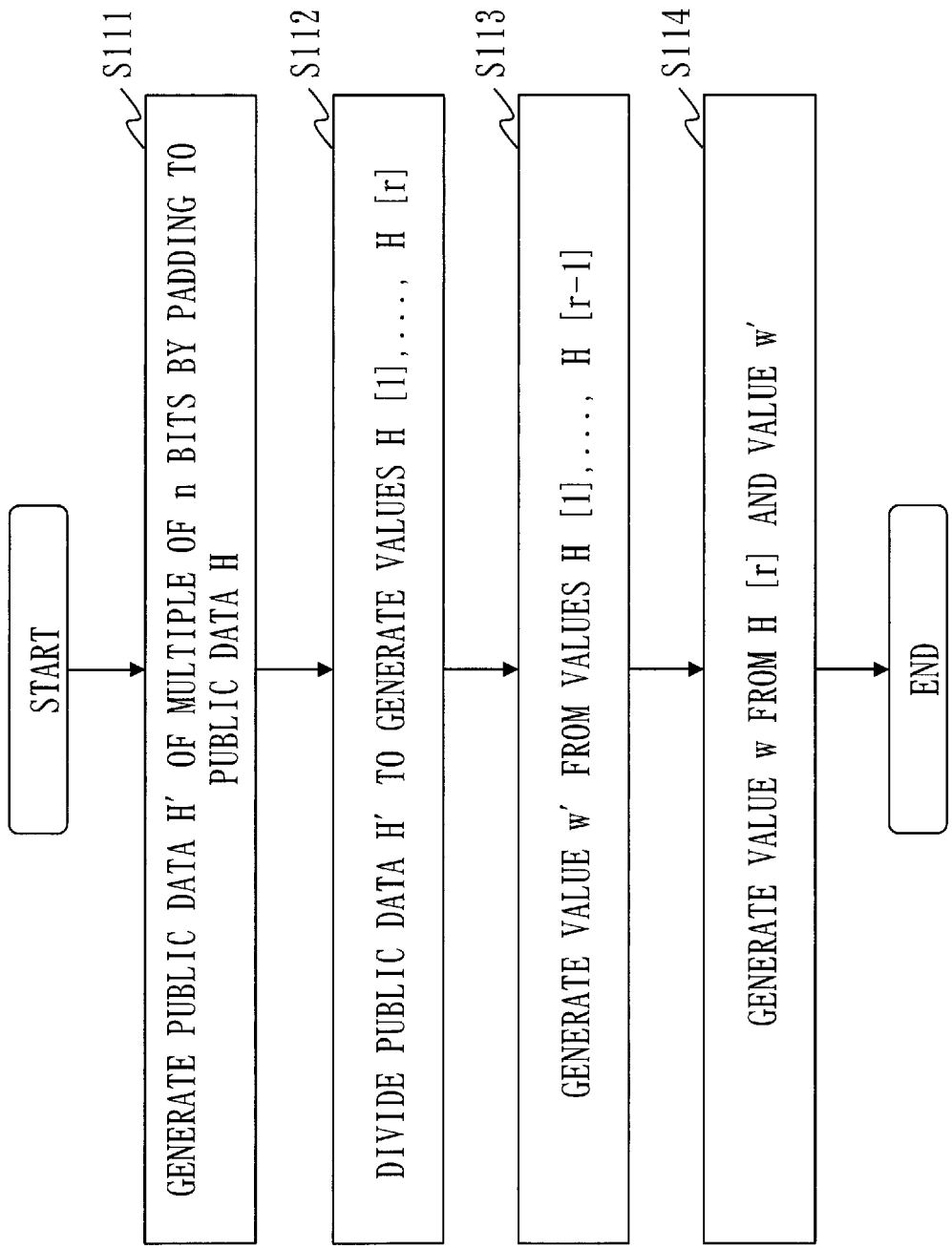
FIG. 29 is a flowchart of a generation method of a value w according to Modification 4.
Figure 30:
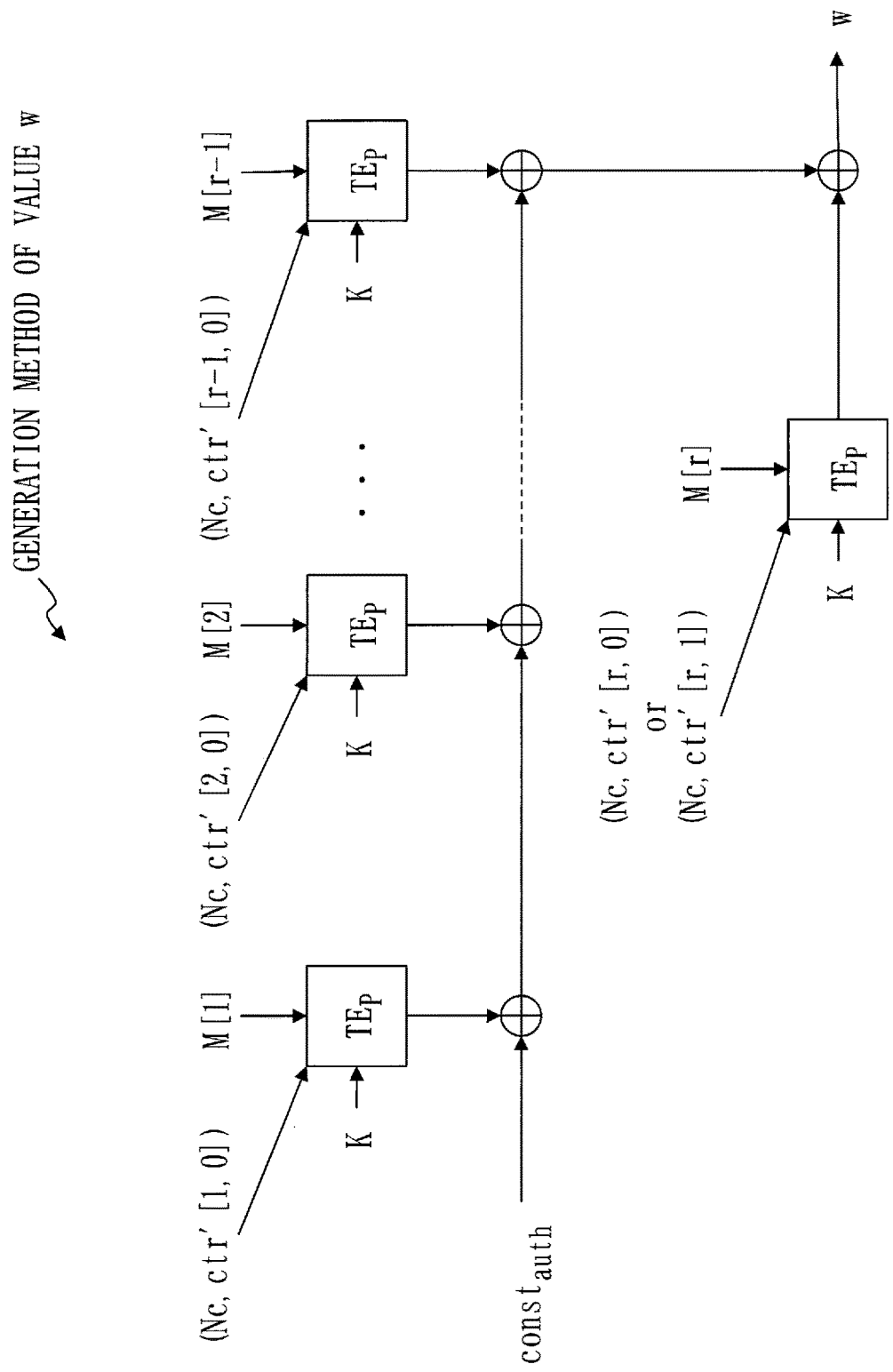
FIG. 30 is an exemplary diagram of the generation method of the value w according to Modification 4.

With reference to FIGS. 29 and 30, a generation method of a value w according to Modification 4 will be described.

(Step S111: Padding Process)

The authenticator generation unit 26 generates public data H' by adding bit strings of 1 and 0 after public data H such that the public data H becomes a multiple of n bits. Note that, in a case where the public data H is a multiple of n bits, the authenticator generation unit 26 sets the public data H as the public data H' as it is.

(Step S112: Division Process)

The division unit 24 divides the public data H' generated in step S111 for every n bits from the beginning, to generate a value H [1], . . . , value H [r] of n bits.

(Step S113: Generation Process of w')

For each integer i of i=1, . . . , r−1, the authenticator generation unit 26 causes the encryption unit 23 to generate a ciphertext c as a ciphertext G [i] of a value H [i], by inputting the value H [i] generated by the division unit 24 in step S112, as a message m.

Specifically, the authenticator generation unit 26 inputs, for each integer i of i=1, . . . , r−1, the value H [i] generated by the division unit 24 in step S112 as the message m, a key $K_C$ as the key $K_f$ and the key $K_h$, an initial parameter N as the first Tweak value TW1, and an internal parameter ctr [i, 0] as the second Tweak value TW2, to the key generation unit 21, the hash calculation unit 22, and the encryption unit 23. Then, for each integer i of i=1, . . . , r−1, the authenticator generation unit 26 causes the key generation unit 21, the hash calculation unit 22, and the encryption unit 23 to execute the encryption function TE described with reference to FIG. 4, with the value H [i], the key $K_C$, the initial parameter Nc, and an internal parameter ctr' [i, 0] as inputs. At this time, the first encryption process is used as the encryption process in step S13 of FIG. 4. Then, the ciphertext generation unit 25 handles the generated ciphertext c as a ciphertext G [i].

Note that the initial parameter N is a common value for each integer i of i=1, . . . , r−1. Therefore, the encryption function TE illustrated in FIG. 4 is executed for each integer i of i=1, . . . , r−1, but generation of the key K in step S11 of FIG. 4 is required to be executed only for a certain integer i.

The authenticator generation unit 26 sets $const_{auth}$ as the initial value of the value w'. The authenticator generation unit 26 calculates a new value w' by calculating an exclusive OR of the value w' and the ciphertext G [i], sequentially for each integer i of i=1, . . . , r−1.

This is expressed in Formula 8.

for $i=1, \ldots, r-1$ $w' = w' \oplus TEp(K, (Nc, ctr'[i,0]), H[i])$ [Formula 8]

(Step S114: Generation Process of w)

The authenticator generation unit 26 causes the encryption unit 23 to generate a ciphertext c as a ciphertext G [r] of a value H [r], by inputting the value H [r] generated by the division unit 24 in step S112, as a message m.

Specifically, the authenticator generation unit 26 inputs the value H [r] generated by the division unit 24 in step S112 as the message m, a key $K_C$ as the key $K_f$ and the key $K_h$, an initial parameter N as the first Tweak value TW1, and an internal parameter ctr [i, 0] as the second Tweak value TW2, to the key generation unit 21, the hash calculation unit 22, and the encryption unit 23. Then, the authenticator generation unit 26 causes the key generation unit 21, the hash calculation unit 22, and the encryption unit 23 to execute the encryption function TE described with reference to FIG. 4, with the value H [r], the key $K_C$, the initial parameter Nc, and the internal parameter ctr' as inputs. At this time, the first encryption process is used as the encryption process in step S13 of FIG. 4. Then, the ciphertext generation unit 25 handles the generated ciphertext c as the ciphertext G [r].

Note that (1) an internal parameter ctr' [r, 0] is used as the internal parameter ctr' in a case where the public data H is a multiple of n bits. (2) An internal parameter ctr [r, 1] different from the internal parameter ctr' [r, 0] is used as the internal parameter ctr' in a case where the public data H is not a multiple of n bits.

Further, for generating the ciphertext G [r], the key K generated at a time of generating the ciphertext G [i] may be used. Therefore, generation of the key K in step S11 of FIG. 4 need not be executed.

The authenticator generation unit 26 calculates the value w by calculating an exclusive OR of the value w' and the ciphertext G [r].

This is expressed in Formula 9.

(1) In case where header h is multiple of n bits $w = w' \oplus TEp(K, (Nc, ctr'[r,0]), H[r])$ (2) In case where header h is not multiple of n bits $w = w' \oplus TEp(K, (Nc, ctr'[e,1]), H[r])$ [Formula 9]

Note that, in steps S113 and S114, the initial parameter N may be used instead of the initial parameter Nc. Further, in steps S113 and S114, the second encryption process may be used as the encryption process of step S13 of FIG. 4.

REFERENCE LIST

1: encryption system, 10: encryption device, 11: processing circuit, 12: processor, 13: memory, 14: storage, 21: key generation unit, 22: hash calculation unit, 23: encryption unit, 24: division unit, 25: ciphertext generation unit, 26: authenticator generation unit, 27: first replacement unit, 28: block cipher calculation unit, 29: second replacement unit, 30: decryption device, 31: processing circuit, 32: processor, 33: memory, 34: storage, 41: key generation unit, 42: hash calculation unit, 43: decryption unit, 44: division unit, 45: plaintext generation unit, 46: verification unit, 47: first replacement unit, 48: block cipher calculation unit, 49: second replacement unit.

The invention claimed is:

1. An encryption device in authentication encryption, the encryption device being communicatively connected to an external decryption device via a network, the encryption device comprising:

processing circuitry to:

generate a key K of an encryption function E of a block cipher, in accordance with an initial parameter N and a first key $K_f$ shared with the external decryption device, the key K being generated using a pseudo-random function;

calculate a hash value msk with an internal parameter ctr and a second key $K_H$ shared with the external decryption device as inputs and without using as an input any of: a value of the initial parameter N, and a value dependent on the initial parameter N; and generate a ciphertext c of the message m by using the encryption function E, with the generated key K, the calculated hash value msk, and a message m as inputs.

2. The encryption device according to claim 1, wherein the processing circuitry calculates a value x by inputting the hash value msk and the message m to a function p that outputs a value β of n bits, with the hash value msk and a value a of n bits as an input, the value a and the value β having a relationship of replacement when the hash value msk is fixed, calculates a value y by the encryption function E, with the calculated value x and the key K as an input, and calculates the ciphertext c by inputting the hash value msk and the calculated value y, to the function p.

3. The encryption device according to claim 1, wherein the encryption function E has a block size of n, and the processing circuitry divides a message M for every n bits to generate a value M [1], . . . , value M [s] of n bits; and for each integer i of i=1, . . . , s, with the generated value M [i] as the message m, generates the ciphertext c as a ciphertext C [i] of the value M [i], and concatenates the ciphertext C [i] for each integer i of i=1, . . . , s to generate a ciphertext C of the message M.

4. The encryption device according to claim 3, wherein the processing circuitry divides the message M to generate a value M [1], . . . , value M [s] of n bits and a value M [*] of r bits smaller than n bits in a case where the message M is not a multiple of n bits, and generates the ciphertext c as a ciphertext R of a fixed value const with the fixed value const as the message m, generates a ciphertext C [*] from r bits in the ciphertext R and the value M [*], and concatenates the ciphertext C [i] for each integer i of i=1, . . . , s and the ciphertext C [*] to generate the ciphertext C.

5. The encryption device according to claim 4, wherein the processing circuitry inputs the hash value msk and the fixed value const to the function p to calculate a value x [R], and calculates the ciphertext R by the encryption function E, with the value x [R] and the key K as an input.

6. The encryption device according to claim 1, wherein the processing circuitry divides the message M for every n bits, calculates an exclusive OR of divided values to generate a checksum, generates the ciphertext c as a ciphertext T' of the checksum with the checksum as the message m, and generates an authenticator T of the message M from the ciphertext T'.

7. The encryption device according to claim 6, wherein the processing circuitry calculates a new checksum from public data H and the checksum, generates the ciphertext c as a ciphertext T' of the new checksum with the new checksum as the message m, and generates an authenticator T of the message M from the ciphertext T'.

8. The encryption device according to claim 6, wherein the processing circuitry generates an authenticator T of the message M from public data H and the ciphertext T'.

9. The encryption device according to claim 1, wherein the processing circuitry generates the key K in accordance with an initial parameter N and public data H.

10. A decryption device in authentication encryption, the decryption device being communicatively connected to an external encryption device via a network, the decryption device comprising:

processing circuitry to:

generate a key K of a decryption function D of a block cipher, in accordance with an initial parameter N and a first key $K_f$ shared with the external encryption device, the key K being generated using a pseudo-random function;

calculate a hash value msk with an internal parameter ctr and a second key $K_H$ shared with the external encryption device as inputs and without using as an input any of: a value of the initial parameter N, and a value dependent on the initial parameter N; and decrypt the ciphertext by using the decryption function D to generate a message m, with the generated key K, the calculated hash value msk, and a ciphertext c as inputs.

\* \* \* \* \*